(12) United States Patent
Wong et al.

(10) Patent No.: US 7,817,659 B2
(45) Date of Patent: Oct. 19, 2010

(54) METHOD AND APPARATUS FOR AGGREGATING INPUT DATA STREAMS

(75) Inventors: Yuen Fai Wong, San Jose, CA (US);
Yu-Mei Lin, Cupertino, CA (US);
Richard A. Grenier, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 978 days.

(21) Appl. No.: 10/810,208

(22) Filed: Mar. 26, 2004

(65) Prior Publication Data

US 2009/0279559 A1    Nov. 12, 2009

(51) Int. Cl.
*H04L 12/54* (2006.01)
(52) U.S. Cl. .................. 370/428; 370/389; 370/474
(58) Field of Classification Search ........... 370/389, 370/473, 428, 400, 474, 535, 536, 537, 538, 370/539, 540, 541, 542, 543, 544, 545
See application file for complete search history.

(56) References Cited

U.S. PATENT DOCUMENTS

| | | |
|---|---|---|
| 3,866,175 A | 2/1975 | Seifert, Jr. et al. |
| 4,628,480 A | 12/1986 | Floyd |
| 4,667,323 A | 5/1987 | Engdahl et al. |
| 4,683,564 A | 7/1987 | Young et al. |
| 4,698,748 A | 10/1987 | Juzswik et al. |
| 4,723,243 A | 2/1988 | Joshi et al. |
| 4,754,482 A | 6/1988 | Weiss |
| 4,791,629 A | 12/1988 | Burns et al. |
| 4,794,629 A | 12/1988 | Pastyr et al. |
| 4,807,280 A | 2/1989 | Posner et al. |
| 4,876,681 A | 10/1989 | Hagiwara et al. |
| 4,896,277 A | 1/1990 | Vercellotti et al. |

(Continued)

FOREIGN PATENT DOCUMENTS

EP    1380127 A2    1/2004

(Continued)

OTHER PUBLICATIONS

U.S. Appl. No. 10/139,912, filed May 6, 2002, Davis et al.

(Continued)

*Primary Examiner*—Ricky Ngo
*Assistant Examiner*—Chandrahas Patel
(74) *Attorney, Agent, or Firm*—Townsend and Townsend and Crew LLP

(57) ABSTRACT

A method and apparatus aggregate a plurality of input data streams from first processors into one data stream for a second processor, the circuit and the first and second processors being provided on an electronic circuit substrate. The aggregation circuit includes (a) a plurality of ingress data ports, each ingress data port adapted to receive an input data stream from a corresponding first processor, each input data stream formed of ingress data packets, each ingress data packet including priority factors coded therein, (b) an aggregation module coupled to the ingress data ports, adapted to analyze and combine the plurality of input data steams into one aggregated data stream in response to the priority factors, (c) a memory coupled to the aggregation module, adapted to store analyzed data packets, and (d) an output data port coupled to the aggregation module, adapted to output the aggregated data stream to the second processor.

56 Claims, 8 Drawing Sheets

U.S. PATENT DOCUMENTS

| | | | |
|---|---|---|---|
| 4,985,889 A | 1/1991 | Frankish et al. | |
| 5,101,404 A | 3/1992 | Kunimoto et al. | |
| 5,136,584 A | 8/1992 | Hedlund | |
| 5,195,181 A | 3/1993 | Bryant et al. | |
| 5,208,856 A | 5/1993 | Leduc et al. | |
| 5,224,108 A | 6/1993 | McDysan et al. | |
| 5,280,582 A | 1/1994 | Yang et al. | |
| 5,282,196 A | 1/1994 | Clebowicz | |
| 5,287,477 A | 2/1994 | Johnson et al. | |
| 5,301,192 A | 4/1994 | Henrion | |
| 5,307,345 A | 4/1994 | Lozowick et al. | |
| 5,323,386 A | 6/1994 | Wiher et al. | |
| 5,365,512 A | 11/1994 | Combs et al. | |
| 5,377,189 A | 12/1994 | Clark | |
| 5,390,173 A | 2/1995 | Spinney et al. | |
| 5,392,279 A | 2/1995 | Taniguchi | |
| 5,406,643 A | 4/1995 | Burke et al. | |
| 5,408,469 A | 4/1995 | Opher et al. | |
| 5,430,442 A | 7/1995 | Kaiser et al. | |
| 5,436,893 A | 7/1995 | Barnett | |
| 5,461,615 A | 10/1995 | Henrion | |
| 5,490,258 A | 2/1996 | Fenner | |
| 5,506,840 A | 4/1996 | Pauwels et al. | |
| 5,521,923 A | 5/1996 | Willmann et al. | |
| 5,546,385 A | 8/1996 | Caspi et al. | |
| 5,550,816 A | 8/1996 | Hardwick et al. | |
| 5,563,948 A | 10/1996 | Diehl et al. | |
| 5,566,170 A | 10/1996 | Bakke et al. | |
| 5,598,410 A | 1/1997 | Stone | |
| 5,600,795 A | 2/1997 | Du | |
| 5,619,497 A | 4/1997 | Gallagher et al. | |
| 5,640,504 A | 6/1997 | Johnson, Jr. | |
| 5,646,878 A | 7/1997 | Samra | |
| 5,663,952 A | 9/1997 | Gentry, Jr. | |
| 5,663,959 A | 9/1997 | Nakagawa et al. | |
| 5,666,353 A | 9/1997 | Klausmeier et al. | |
| 5,721,819 A | 2/1998 | Galles et al. | |
| 5,732,080 A | 3/1998 | Ferguson et al. | |
| 5,740,176 A | 4/1998 | Gupta et al. | |
| 5,745,708 A | 4/1998 | Weppler et al. | |
| 5,751,710 A | 5/1998 | Crowther et al. | |
| 5,802,287 A | 9/1998 | Rostoker et al. | |
| 5,815,146 A | 9/1998 | Youden et al. | |
| 5,818,816 A | 10/1998 | Chikazawa et al. | |
| 5,835,496 A | 11/1998 | Yeung et al. | |
| 5,838,684 A | 11/1998 | Wicki et al. | |
| 5,862,350 A | 1/1999 | Coulson | |
| 5,867,675 A | 2/1999 | Lomelino et al. | |
| 5,870,538 A | 2/1999 | Manning et al. | |
| 5,872,769 A | 2/1999 | Caldara et al. | |
| 5,872,783 A | 2/1999 | Chin | |
| 5,875,200 A | 2/1999 | Glover et al. | |
| 5,907,566 A | 5/1999 | Benson et al. | |
| 5,907,660 A | 5/1999 | Inoue et al. | |
| 5,909,686 A | 6/1999 | Muller et al. | |
| 5,915,094 A | 6/1999 | Kouloheris et al. | |
| 5,920,566 A | 7/1999 | Hendel et al. | |
| 5,920,886 A | 7/1999 | Feldmeier | |
| 5,936,939 A | 8/1999 | Des Jardins et al. | |
| 5,936,966 A | 8/1999 | Ogawa et al. | |
| 5,956,347 A | 9/1999 | Slater | |
| 5,999,528 A | 12/1999 | Chow et al. | |
| 6,000,016 A | 12/1999 | Curtis et al. | |
| 6,016,310 A | 1/2000 | Muller et al. | |
| 6,023,471 A | 2/2000 | Haddock et al. | |
| 6,035,414 A | 3/2000 | Okazawa et al. | |
| 6,038,288 A | 3/2000 | Thomas et al. | |
| 6,067,298 A | 5/2000 | Shinohara | |
| 6,067,606 A | 5/2000 | Holscher et al. | |
| 6,076,115 A | 6/2000 | Sambamurthy et al. | |
| 6,081,522 A | 6/2000 | Hendel et al. | |
| 6,088,356 A | 7/2000 | Hendel et al. | |
| 6,094,434 A | 7/2000 | Kotzur et al. | |
| 6,104,696 A | 8/2000 | Kadambi et al. | |
| 6,104,700 A | 8/2000 | Haddock et al. | |
| 6,108,306 A | 8/2000 | Kalkunte et al. | |
| 6,118,787 A | 9/2000 | Kalkunte et al. | |
| 6,125,417 A | 9/2000 | Bailis et al. | |
| 6,128,666 A | 10/2000 | Muller et al. | |
| 6,144,668 A | 11/2000 | Bass et al. | |
| 6,147,996 A | 11/2000 | Laor et al. | |
| 6,151,301 A | 11/2000 | Holden | |
| 6,154,446 A | 11/2000 | Kadambi et al. | |
| 6,157,643 A | 12/2000 | Ma | |
| 6,160,809 A | 12/2000 | Adiletta et al. | |
| 6,172,990 B1 | 1/2001 | Deb et al. | |
| 6,178,520 B1 | 1/2001 | DeKoning et al. | |
| 6,181,699 B1 | 1/2001 | Crinion et al. | |
| 6,222,845 B1 | 4/2001 | Shue et al. | |
| 6,243,667 B1 | 6/2001 | Kerr et al. | |
| 6,263,374 B1 | 7/2001 | Olnowich et al. | |
| 6,272,144 B1 | 8/2001 | Berenbaum et al. | |
| 6,304,903 B1 | 10/2001 | Ward | |
| 6,320,859 B1 | 11/2001 | Momirov | |
| 6,333,929 B1 | 12/2001 | Drottar et al. | |
| 6,335,932 B2 | 1/2002 | Kadambi et al. | |
| 6,335,935 B2 * | 1/2002 | Kadambi et al. | 370/396 |
| 6,343,072 B1 | 1/2002 | Bechtolsheim et al. | |
| 6,351,143 B1 | 2/2002 | Guccione et al. | |
| 6,356,550 B1 | 3/2002 | Williams | |
| 6,356,942 B1 | 3/2002 | Bengtsson et al. | |
| 6,363,077 B1 | 3/2002 | Wong et al. | |
| 6,369,855 B1 | 4/2002 | Chauvel et al. | |
| 6,421,352 B1 * | 7/2002 | Manaka et al. | 370/445 |
| 6,424,658 B1 | 7/2002 | Mathur | |
| 6,424,659 B2 | 7/2002 | Viswanadham et al. | |
| 6,427,185 B1 | 7/2002 | Ryals et al. | |
| 6,460,088 B1 | 10/2002 | Merchant | |
| 6,463,063 B1 | 10/2002 | Bianchini, Jr. et al. | |
| 6,466,608 B1 | 10/2002 | Hong et al. | |
| 6,470,436 B1 | 10/2002 | Croft et al. | |
| 6,473,433 B1 | 10/2002 | Bianchini, Jr. et al. | |
| 6,477,174 B1 | 11/2002 | Dooley et al. | |
| 6,480,477 B1 | 11/2002 | Treadway et al. | |
| 6,490,280 B1 | 12/2002 | Leung | |
| 6,493,347 B2 | 12/2002 | Sindhu et al. | |
| 6,496,502 B1 | 12/2002 | Fite, Jr. et al. | |
| 6,522,656 B1 | 2/2003 | Gridley | |
| 6,532,229 B1 | 3/2003 | Johnson et al. | |
| 6,532,234 B1 | 3/2003 | Yoshikawa et al. | |
| 6,535,504 B1 | 3/2003 | Johnson et al. | |
| 6,549,519 B1 | 4/2003 | Michels et al. | |
| 6,553,370 B1 | 4/2003 | Andreev et al. | |
| 6,556,208 B1 | 4/2003 | Congdon et al. | |
| 6,567,404 B1 | 5/2003 | Wilford | |
| 6,591,302 B2 | 7/2003 | Boucher et al. | |
| 6,606,300 B1 | 8/2003 | Blanc et al. | |
| 6,643,269 B1 | 11/2003 | Fan et al. | |
| 6,654,342 B1 | 11/2003 | Dittia et al. | |
| 6,654,346 B1 | 11/2003 | Mahalingaiah et al. | |
| 6,654,370 B1 | 11/2003 | Quirke et al. | |
| 6,654,373 B1 * | 11/2003 | Maher, III et al. | 370/392 |
| 6,658,002 B1 | 12/2003 | Ross et al. | |
| 6,661,791 B1 | 12/2003 | Brown | |
| 6,671,275 B1 | 12/2003 | Wong et al. | |
| 6,678,248 B1 | 1/2004 | Haddock et al. | |
| 6,681,332 B1 | 1/2004 | Byrne et al. | |
| 6,687,247 B1 | 2/2004 | Wilford et al. | |
| 6,691,202 B2 | 2/2004 | Vasquez et al. | |
| 6,696,917 B1 | 2/2004 | Heitner et al. | |
| 6,697,359 B1 | 2/2004 | George | |
| 6,697,368 B2 | 2/2004 | Chang et al. | |
| 6,700,894 B1 | 3/2004 | Shung | |
| 6,708,000 B1 | 3/2004 | Nishi et al. | |

| | | | | | | |
|---|---|---|---|---|---|---|
| 6,721,229 B1 | 4/2004 | Cole | | 7,283,547 B1 | 10/2007 | Hook et al. |
| 6,721,268 B1 | 4/2004 | Ohira et al. | | 7,286,534 B2 | 10/2007 | Kloth |
| 6,721,313 B1 | 4/2004 | Van Duyne | | 7,324,509 B2 | 1/2008 | Ni |
| 6,735,218 B2 | 5/2004 | Chang et al. | | 7,355,970 B2 | 4/2008 | Lor |
| 6,745,277 B1 | 6/2004 | Lee et al. | | 7,356,030 B2 | 4/2008 | Chang et al. |
| 6,751,224 B1 | 6/2004 | Parruck et al. | | 7,366,100 B2 | 4/2008 | Anderson et al. |
| 6,754,881 B2 | 6/2004 | Kuhlmann et al. | | 7,391,769 B2 * | 6/2008 | Rajkumar et al. ........... 370/389 |
| 6,765,866 B1 | 7/2004 | Wyatt | | 7,428,693 B2 | 9/2008 | Obuchi et al. |
| 6,775,706 B1 | 8/2004 | Fukumoto et al. | | 7,512,127 B2 | 3/2009 | Chang et al. |
| 6,778,546 B1 | 8/2004 | Epps et al. | | 7,561,590 B1 * | 7/2009 | Walsh ........................ 370/416 |
| 6,781,990 B1 | 8/2004 | Puri et al. | | 7,596,139 B2 | 9/2009 | Patel et al. |
| 6,792,484 B1 | 9/2004 | Hook | | 7,613,991 B1 | 11/2009 | Bain |
| 6,792,502 B1 | 9/2004 | Pandya et al. | | 7,636,369 B2 | 12/2009 | Wong |
| 6,798,740 B1 | 9/2004 | Senevirathne et al. | | 7,649,885 B1 | 1/2010 | Davis |
| 6,804,220 B2 | 10/2004 | Odenwalder et al. | | 7,657,703 B1 | 2/2010 | Singh |
| 6,804,731 B2 | 10/2004 | Chang et al. | | 2001/0001879 A1 | 5/2001 | Kubik et al. |
| 6,807,179 B1 | 10/2004 | Kanuri et al. | | 2001/0007560 A1 | 7/2001 | Masuda et al. |
| 6,807,363 B1 | 10/2004 | Abiko et al. | | 2001/0026551 A1 | 10/2001 | Horlin |
| 6,810,046 B2 * | 10/2004 | Abbas et al. ................ 370/545 | | 2001/0048785 A1 | 12/2001 | Steinberg |
| 6,813,243 B1 | 11/2004 | Epps et al. | | 2001/0053150 A1 | 12/2001 | Clear et al. |
| 6,813,266 B1 | 11/2004 | Chiang et al. | | 2002/0001307 A1 | 1/2002 | Nguyen et al. |
| 6,816,467 B1 | 11/2004 | Muller et al. | | 2002/0040417 A1 | 4/2002 | Winograd et al. |
| 6,831,923 B1 | 12/2004 | Laor et al. | | 2002/0054594 A1 | 5/2002 | Hoof et al. |
| 6,831,932 B1 | 12/2004 | Boyle et al. | | 2002/0054595 A1 | 5/2002 | Ambe et al. |
| 6,836,808 B2 | 12/2004 | Bunce et al. | | 2002/0069294 A1 | 6/2002 | Herkersdorf et al. |
| 6,839,346 B1 | 1/2005 | Kametani | | 2002/0073073 A1 | 6/2002 | Cheng |
| 6,842,422 B1 | 1/2005 | Bianchini, Jr. | | 2002/0085499 A1 | 7/2002 | Toyoyama et al. |
| 6,854,117 B1 | 2/2005 | Roberts | | 2002/0087788 A1 | 7/2002 | Morris |
| 6,859,438 B2 | 2/2005 | Haddock et al. | | 2002/0089937 A1 | 7/2002 | Venkatachary et al. |
| 6,865,153 B1 | 3/2005 | Hill et al. | | 2002/0089977 A1 | 7/2002 | Chang et al. |
| 6,901,072 B1 | 5/2005 | Wong | | 2002/0091844 A1 | 7/2002 | Craft et al. |
| 6,912,637 B1 | 6/2005 | Herbst | | 2002/0091884 A1 | 7/2002 | Chang et al. |
| 6,920,154 B1 | 7/2005 | Achler | | 2002/0097713 A1 | 7/2002 | Chang et al. |
| 6,925,516 B2 | 8/2005 | Struhsaker et al. | | 2002/0105966 A1 | 8/2002 | Patel et al. |
| 6,934,305 B1 | 8/2005 | Dushcatko et al. | | 2002/0110180 A1 | 8/2002 | Barney et al. |
| 6,937,606 B2 | 8/2005 | Basso et al. | | 2002/0126672 A1 | 9/2002 | Chow et al. |
| 6,946,948 B2 | 9/2005 | McCormack et al. | | 2002/0131437 A1 | 9/2002 | Tagore-Brage |
| 6,957,258 B2 | 10/2005 | Maher, III et al. | | 2002/0141403 A1 | 10/2002 | Akahane et al. |
| 6,959,007 B1 | 10/2005 | Vogel et al. | | 2002/0146013 A1 | 10/2002 | Karlsson et al. |
| 6,973,092 B1 | 12/2005 | Zhou et al. | | 2002/0161967 A1 | 10/2002 | Kirihata et al. |
| 6,978,309 B1 | 12/2005 | Dorbolo | | 2002/0191605 A1 | 12/2002 | Van Lunteren et al. |
| 6,980,552 B1 | 12/2005 | Belz et al. | | 2003/0009466 A1 | 1/2003 | Ta et al. |
| 6,990,102 B1 | 1/2006 | Kaniz et al. | | 2003/0033435 A1 | 2/2003 | Hanner |
| 7,005,812 B2 | 2/2006 | Mitchell | | 2003/0043800 A1 | 3/2003 | Sonksen et al. |
| 7,009,968 B2 | 3/2006 | Ambe et al. | | 2003/0043848 A1 | 3/2003 | Sonksen |
| 7,012,919 B1 | 3/2006 | So et al. | | 2003/0048785 A1 | 3/2003 | Calvignac et al. |
| 7,050,430 B2 | 5/2006 | Kalkunte et al. | | 2003/0061459 A1 | 3/2003 | Aboulenein et al. |
| 7,080,238 B2 | 7/2006 | Van Hoof et al. | | 2003/0074657 A1 | 4/2003 | Bramley, Jr. |
| 7,082,133 B1 | 7/2006 | Lor et al. | | 2003/0095548 A1 | 5/2003 | Yamano |
| 7,103,041 B1 | 9/2006 | Speiser et al. | | 2003/0103499 A1 | 6/2003 | Davis et al. |
| 7,126,956 B2 * | 10/2006 | Scholten .................... 370/412 | | 2003/0108052 A1 | 6/2003 | Inoue et al. |
| 7,151,797 B2 | 12/2006 | Limberg | | 2003/0110180 A1 | 6/2003 | Calvignac et al. |
| 7,161,948 B2 | 1/2007 | Sampath et al. | | 2003/0115403 A1 | 6/2003 | Bouchard et al. |
| 7,167,471 B2 | 1/2007 | Calvignac et al. | | 2003/0120861 A1 | 6/2003 | Calle et al. |
| 7,176,911 B1 | 2/2007 | Kidono et al. | | 2003/0128668 A1 | 7/2003 | Yavatkar et al. |
| 7,185,141 B1 | 2/2007 | James et al. | | 2003/0137978 A1 | 7/2003 | Kanetake |
| 7,185,266 B2 | 2/2007 | Blightman et al. | | 2003/0152084 A1 | 8/2003 | Lee et al. |
| 7,187,687 B1 | 3/2007 | Davis et al. | | 2003/0152096 A1 | 8/2003 | Chapman |
| 7,190,696 B1 | 3/2007 | Manur et al. | | 2003/0156586 A1 | 8/2003 | Lee et al. |
| 7,191,277 B2 | 3/2007 | Broyles | | 2003/0159086 A1 | 8/2003 | Arndt |
| 7,191,468 B2 | 3/2007 | Hanner | | 2003/0165160 A1 | 9/2003 | Minami et al. |
| 7,203,194 B2 | 4/2007 | Chang et al. | | 2003/0174719 A1 | 9/2003 | Sampath et al. |
| 7,206,283 B2 | 4/2007 | Chang et al. | | 2003/0177221 A1 | 9/2003 | Ould-Brahim et al. |
| 7,212,536 B2 * | 5/2007 | Mackiewich et al. ... 370/395.42 | | 2003/0214956 A1 | 11/2003 | Navada et al. |
| 7,218,637 B1 | 5/2007 | Best et al. | | 2003/0215029 A1 | 11/2003 | Limberg |
| 7,219,293 B2 | 5/2007 | Tsai et al. | | 2003/0223424 A1 | 12/2003 | Anderson et al. |
| 7,228,509 B1 | 6/2007 | Dada et al. | | 2003/0227943 A1 | 12/2003 | Hallman et al. |
| 7,230,917 B1 * | 6/2007 | Fedorkow et al. ........... 370/229 | | 2004/0022263 A1 | 2/2004 | Zhao et al. |
| 7,236,490 B2 | 6/2007 | Chang et al. | | 2004/0028060 A1 | 2/2004 | Kang |
| 7,237,058 B2 | 6/2007 | Srinivasan | | 2004/0054867 A1 | 3/2004 | Stravers et al. |
| 7,249,306 B2 | 7/2007 | Chen | | 2004/0062246 A1 | 4/2004 | Boucher et al. |
| 7,266,117 B1 | 9/2007 | Davis | | 2004/0088469 A1 | 5/2004 | Levy |
| 7,277,425 B1 | 10/2007 | Sikdar | | 2004/0128434 A1 | 7/2004 | Khanna et al. |

| | | |
|---|---|---|
| 2004/0141504 A1 | 7/2004 | Blanc et al. |
| 2004/0190547 A1 | 9/2004 | Gordy et al. |
| 2004/0208177 A1 | 10/2004 | Ogawa |
| 2004/0223502 A1 | 11/2004 | Wybenga et al. |
| 2004/0264380 A1 | 12/2004 | Kalkuntew et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0097432 A1 | 5/2005 | Obuchi et al. |
| 2005/0132132 A1 | 6/2005 | Rosenbluth et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1 | 7/2005 | Lodha et al. |
| 2005/0175018 A1 | 8/2005 | Wong |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura |
| 2006/0077891 A1 | 4/2006 | Smith et al. |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2007/0038798 A1 | 2/2007 | Bouchard et al. |
| 2007/0088974 A1 | 4/2007 | Chandwani et al. |
| 2007/0179909 A1 | 8/2007 | Channasagara |
| 2007/0208876 A1 | 9/2007 | Davis |
| 2007/0253420 A1 | 11/2007 | Chang et al. |
| 2007/0258475 A1 | 11/2007 | Chinn et al. |
| 2007/0288690 A1 | 12/2007 | Wang et al. |
| 2008/0002707 A1 | 1/2008 | Davis |
| 2008/0031263 A1 | 2/2008 | Ervin et al. |
| 2008/0037544 A1 | 2/2008 | Yano et al. |
| 2008/0049742 A1 | 2/2008 | Bansal |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279546 A1 | 11/2009 | Davis |
| 2009/0279548 A1 | 11/2009 | Davis et al. |
| 2009/0279558 A1 | 11/2009 | Davis et al. |
| 2009/0279559 A1 | 11/2009 | Wong et al. |
| 2009/0279561 A1 | 11/2009 | Chang et al. |
| 2009/0282148 A1 | 11/2009 | Wong et al. |
| 2009/0282322 A1 | 11/2009 | Wong et al. |
| 2009/0287952 A1 | 11/2009 | Patel et al. |
| 2009/0290499 A1 | 11/2009 | Patel et al. |

FOREIGN PATENT DOCUMENTS

| | | |
|---|---|---|
| JP | 2003-289359 A | 10/2003 |
| JP | 2004-537871 T | 12/2004 |
| WO | WO 01/84728 A1 | 11/2001 |
| WO | WO 02/041544 A2 | 5/2002 |

OTHER PUBLICATIONS

U.S. Appl. No. 10/140,749, filed May 6, 2002, Davis et al.
U.S. Appl. No. 10/140,751, filed May 6, 2002, Davis et al.
U.S. Appl. No. 10/140,752, filed May 6, 2002, Davis.
U.S. Appl. No. 10/140,753, filed May 6, 2002, Davis et al.
U.S. Appl. No. 10/141,223, filed May 7, 2002, Veerabadran et al.
U.S. Appl. No. 10/832,086, filed Apr. 26, 2004, Wong.
U.S. Appl. No. 11/621,038, filed Jan. 8, 2007, Davis et al.
U.S. Appl. No. 11/828,246, filed Jul. 25, 2007, Davis.
10 Gigabit Ethernet—Technology Overview White Paper, Sep. 2001, 16 pages.
10 Gigabit Ethernet Alliance, Interconnection with Wide Area Networks, Version 1.0, Mar. 2002, 5 pages.
Degermark, M., et al., "Small Forwarding Tables for Fast Routing Lookups," ACM Computer Communications Review 27(4):3-14, Oct. 1997.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "BigIron Architecture Technical Brief," Dec. 1998—Version 1.03, 14 pages.
Foundry Networks, "BigIron Architecture Technical Brief," May 1999—Version 2.0, 15 pages.
Foundry Networks, "BigIron Architecture Technical Brief," May, 1999—Version 2.01, 15 pages.
Foundry Networks, "BigIron Architecture Technical Brief," Jul. 2001—Version 2.02, 16 pages.
Foundry Networks, "Foundry Networks," Next Generation Terabit System Architecture—The High Performance Revolution for 10 Gigabit Networks, Nov. 17, 2003.
Gigabit Ethernet Alliance—"Accelerating the Standard for Speed," Copyright 1998, 10 pages.
Kichorowsky, R., et al., "Mindspeed.TM. Switch Fabric Offers the Most Comprehensive Solution for Multi-Protocol Networking Equipment," Apr. 30, 2001, 3 pages.
Matsumoto, C., et al., "Switch Fabrics Touted At Interconnects Conference," Aug. 21, 2000, URL= http://www.eetimes.com/story/OEG20000821S0011, accessed Aug. 12, 2002, 2 pages.
McAuley, A., et al., "Fast Routing Table Lookup Using CAMs," Proceedings of INFOCOM, Mar.-Apr. 1993, pp. 1382-1391.
Foundry Networks, "JetCore™ Based Chassis Systems—An Architecture Brief on NetIron, BigIron, and FastIron Systems," Jan. 17, 2003.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.
Mindspeed—A Conexant Business, "Switch Fabric Chipset—CX27300 iScale.TM.," Apr. 30, 2001, 2 pages.
Mindspeed—A Conexant Business, "17×17 3.2 Gbps Crosspoint Switch with Input Equalization—M21110," Feb. 1, 2001, 2 pages.
The Tolly Group, "Foundry Networks, Inc.—BigIron 4000, Layer 2 & Layer 3 Interoperability Evaluation," No. 199133, Oct. 1999, 4 pages.
The Tolly Group, "Foundry Networks, Inc.—BigIron 8000 Gigabit Ethernet Switching Router, Layer 2 & Layer 3 Performance Evaluation," No. 199111, May 1999, 4 pages.
U.S. Appl. No. 11/779,778, filed Jul. 18, 2007, Wong et al.
U.S. Appl. No. 11/779,714, filed Jul. 18, 2007, Wong et al.
Belhadj et al., "Feasibility of a 100GE MAC", IEEE Meeting Nov. 2006, 18 pages.
Braun et al., "Fast incremental CRC updates for IP over ATM networks," IEEE Workshop on High Performance Switching and Routing, 2001, pp. 48-52.
International Search Report of Jun. 17, 2003 for application No. PCT/US03/08719.
Satran et al., "Out of Order Incremental CRC Computation," IEEE Transactions on Computers, vol. 54, Issue 9 Sep. 2005), pp. 1178-1181.
Spurgeon, C., "Ethernet, The Definitive Guide," O'Reilly & Associates, Inc., Sebastapol, CA, Feb. 2000.

ANSI/IEEE Standard 802.1D, 1998 Edition (373 pages).
U.S. Appl. No. 11/724,965.
U.S. Appl. No. 11/586,991, filed Oct. 25, 2006, Ramanathan.
U.S. Appl. No. 11/831,950, filed Jul. 31, 2007, Ravindran et al.
U.S. Appl. No. 11/118,697, filed Apr. 28, 2005, Singh.
U.S. Appl. No. 11/953,742, filed Dec. 10, 2007, Wong et al.
U.S. Appl. No. 11/953,743, filed Dec. 10, 2007, Wong et al.
U.S. Appl. No. 11/953,745, filed Dec. 10, 2007, Wong et al.
U.S. Appl. No. 11/953,751, filed Dec. 10, 2007, Wong et al.
Notice of Allowance for U.S. Appl. No. 09/988,066, Mailed Jan. 9, 2009, 13 pages.
Non-Final Office Action for U.S. Appl. No. 11/668,322, Mailed Mar. 23, 2009, 19 pages.
Non-Final Office Action for U.S. Appl. No. 10/832,086, Mailed Apr. 1, 2009, 17 pages.
U.S. Appl. No. 12/400,594, filed Mar. 9, 2009, Patel et al.
U.S. Appl. No. 12/400,645, filed Mar. 9, 2009, Patel et al.
U.S. Appl. No. 12/372,390, filed Feb. 17, 2009, Chang et al.
U.S. Appl. No. 12/417,913, filed Apr. 3, 2009, Patel et al.
Final Office Action for U.S. Appl. No. 10/140,751, Mailed Mar. 17, 2009, 17 pages.
Non-Final Office Action for U.S. Appl. No. 11/615,769, Mailed Apr. 15, 2009, 11 pages.
Non-Final Office Action for U.S. Appl. No. 11/621,038, Mailed Apr. 23, 2009, 44 pages.
Non-Final Office Action for U.S. Appl. No. 11/745,008, Mailed May 14, 2009, 27 pages.
Non Final Office Action for U.S. Appl. No. 11/804,977, Mailed Jan. 14, 2008, 13 pages.
Notice of Allowance for U.S. Appl. No. 11/804,977, Mailed Nov. 19, 2008, 17 pages.
Newton, Newton's Telecom Dictionary, CMP Books, Mar. 2004, 20th Ed., p. 617.
International Preliminary Examination Report for Application No. PCT/US2001/043113, mailed Nov. 6, 2003, 6pages.
Written Opinion of the International Searching Authority for Application No. PCT/US2001/043113, mailed May 1, 2003, 6 pages.
International Search Report for Application No. PCT/US2001/043113, mailed Dec. 13, 2002, 2 pages.
Non-Final Office Action for U.S. Appl. No. 09/855,024. mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003. 6 pages.
Non-Final Office Action for U.S. Appl. No. 10/810,301, mailed Mar. 17, 2005, 11 pages.
Non-Final Office Action for U.S. Appl. No. 10/810,301, mailed Feb. 16, 2006, 12 pages.
Notice of Allowance for U.S. Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003.
Notice of Allowance for U.S. Appl. No. 10/438,545, mailed Jun. 15, 2004.
Non-Final Office Action for U.S. Appl. No. 11/611,067, mailed Feb. 20, 2009, 11 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non-Final Office Action for U.S. Appl. No. 11/586,991, mailed Oct. 2, 2008, 23 pages.
Requirement for Restriction/Election for U.S. Appl. No. 10/140,752, May 18, 2006, 8 pages.
Non-Final Office Action for U.S. Appl. No. 10/140,752, Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/854,486, mailed Jul. 20, 2009, 29 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.

Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Advisory Action for U.S. Appl. No. 10/140,751, mailed Jun. 1, 2009, 3 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action For U.S. Appl. No. 11/000,359, mailed May 29, 2009, 14 pages.
Requirement for Restriction/Election for U.S. Appl. No. 11/118,697, mailed Jun. 2, 2009, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
U.S. Appl. No. 12/198,697, filed Aug. 26, 2008, Hsu et al.
U.S. Appl. No. 12/505,390, filed Jul. 17, 2009, Patel et al.
Final Office Action for U.S. Appl. No. 10/832,086, mailed on Sep. 29, 2009, 26 pages.
Non-Final Office Action for U.S. Appl. No. 11/831,950, mailed on Aug. 18, 2009, 49 pages.
Non-Final Office Action for U.S. Appl. No. 11/779,714, mailed on Sep. 1, 2009, 58 pages.
Non-Final Office Action for U.S. Appl. No. 10/140,751, mailed on Sep. 28, 2009, 34 pages.
Notice of Allowance for U.S. Appl. No. 11/000,359, mailed on Sep. 22, 2009, 17 pages.
Notice of Allowance for U.S. Appl. No. 11/118,697, mailed on Sep. 30, 2009, 41 pages.
U.S. Appl. No. 12/639,762, filed Dec. 16, 2009, Singh.
U.S. Appl. No. 12/639,749, filed Dec. 16, 2009, Singh.
U.S. Appl. No. 12/624,300, filed Nov. 23, 2009, Davis et al.
U.S. Appl. No. 12/608,985, filed Oct. 29, 2009, Wong.
U.S. Appl. No. 12/608,972, filed Oct. 29, 2009, Wong.
Final Office Action for U.S. Appl. No. 11/831,950, mailed on Jan. 6, 2010, 21 pages.
Non-Final Office Action for U.S. Appl. No. 11/953,742, mailed on Nov. 19, 2009, 51 pages.
Non-Final Office Action for U.S. Appl. No. 11/953,743, mailed on Nov. 23, 2009, 47 pages.
Non-Final Office Action for U.S. Appl. No. 11/953,745, mailed on Nov. 24, 2009, 48 pages.
Non-Final Office Action for U.S. Appl. No. 11/953,751, mailed on Nov. 16, 2009, 55 pages.
Requirement for Restriction/Election for U.S. Appl. No. 11/668,322, mailed on Oct. 29, 2009, 6 pages.
Non-Final Office Action for U.S. Appl. No. 11/854,486, mailed on Jan. 12, 2010, 23 pages.
Notice of Allowance for U.S. Appl. No. 10/139,912, mailed on Oct. 19, 2009, 17 pages.
Notice of Allowance for U.S. Appl. No. 10/139,912, mailed on Nov. 23, 2009, 4 pages.
Final Office Action for U.S. Appl. No. 11/745,008, mailed on Dec. 30, 2009, 27 pages.
Notice of Allowance for U.S. Appl. No. 11/828,246, mailed on Nov. 16, 2009, 20 pages.
Final Office Action for U.S. Appl. No. 11/621,038, mailed on Dec. 23, 2009, 27 pages.
Non-Final Office Action for U.S. Appl. No. 12/198,697, mailed on Feb. 2, 2010, 50 pages.

Final Office Action for U.S. Appl. No. 10/140,749, mailed Jan. 13, 2010, 44 pages.
Final Office Action for U.S. Appl. No. 11/611,067, mailed on Oct. 16, 2009, 35 pages.
Non-Final Office Action for U.S. Appl. No. 11/611,067, mailed on Dec. 8, 2009, 11 pages.
Final Office Action for U.S. Appl. No. 11/615,769, mailed on Jan. 22, 2010, 34 pages.
Advisory Action for U.S. Appl. No. 11/831,950, mailed on Mar. 4, 2010, 4 pages.
Non-Final Office Action for U.S. Appl. No. 11/779,714, mailed on Mar. 31, 2010, 26 pages.
Final Office Action for U.S. Appl. No. 11/668,322, mailed on Feb. 24, 2010, 33 pages.
Final Office Action for U.S. Appl. No. 10/140,751, mailed on Mar. 25, 2010, 29 pages.
Advisory Action for U.S. Appl. No. 11/745,008, mailed on Apr. 21, 2010, 8 pages.
Notice of Allowance for U.S. Appl. No. 11/621,038, mailed on Apr. 28, 2010, 15 pages.
Non-Final Office Action for U.S. Appl. No. 12/372,390, mailed on Apr. 22, 2010, 46 pages.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
Non-Final Office Action for U.S. Appl. No. 11/953,745, mailed on Jun. 14, 2010, 19 pages.
Final Office Action for U.S. Appl. No. 11/953,751, mailed on Jun. 25, 2010, 24 pages.
Non-Final Office Action for U.S. Appl. No. 11/668,322, mailed on Jun. 22, 2010, 16 pages.
Notice of Allowance for U.S. Appl. No. 11/854,486, mailed on Jul. 13, 2010, 12 pages.
Final Office Action for U.S. Appl. No. 12/198,697, mailed on Aug. 2, 2010, 55 pages.
Non-Final Office Action for U.S. Appl. No. 12/400,594, mailed on May 14, 2010, 53 pages.
Non-Final Office Action for U.S. Appl. No. 12/070,893, mailed on Jun. 10, 2010, 44 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 14 pages.

* cited by examiner

METHOD AND APPARATUS FOR AGGREGATING INPUT DATA STREAMS

FIELD OF THE INVENTION

The present invention relates to network interface devices. More particularly, the present invention relates to a method and apparatus for aggregating input data streams from first processors into one data stream for a second processor.

BACKGROUND OF THE INVENTION

Switched Ethernet technology has continued evolving beyond the initial 10 Mbps (bit per second). Gigabit Ethernet technology complying the Institute of Electrical and Electronics Engineers (IEEE) 1000BASE-T Standard (IEEE 802.3 2002-2002) meets demands for greater speed and bandwidth of increasing network traffic. Gigabit over Copper technologies provides high performance in the Enterprise local area network (LAN) and accelerates the adoption of Gigabit Ethernet in various areas, such as server farms, cluster computing, distributed computing, bandwidth-intensive applications, and the like. Gigabit over Copper technologies can be integrated into the motherboard of a computer system, and many server makers are offering integrated Gigabit over Copper ports, which is also referred to as LAN on Motherboard.

Gigabit Ethernet works seamlessly with existing Ethernet and Fast Ethernet networks, as well as Ethernet adapters and switches. The 1 Gbps (i.e., 1000 Mbps) speeds of Gigabit Ethernet are 10 times faster than Fast Ethernet (IEEE 100BASE-T), and 100 times faster than standard Ethernet (IEEE 10BASE-T). 10Gigabit Ethernet (10 GbE) enables Gigabit to be migrated into an Enterprise LAN by providing the appropriate backbone connectivity. For example, 10 GbE delivers a bandwidth required to support access to Gigabit over Copper attached server farms.

Switch fabrics and packet processors in high-performance broadband switches, such as Gigabit Ethernet switches or line cards, typically run at a fraction of their rated or maximum capacity. That is, typical processing loads do not require the full capacity of the switch fabrics and packet processors. Thus, it would be desirable to provided a scheme to allow such switch fabrics or packet processors to "oversubscribe" data to achieve more efficient usage of the processing capacity, where oversubscription means that the capacity of the data feed is larger than the capacity of data processing or switching.

BRIEF DESCRIPTION OF THE INVENTION

A method and apparatus aggregate a plurality of input data streams from first processors into one data stream for a second processor, the circuit and the first and second processors being provided on an electronic circuit substrate. The aggregation circuit includes (a) a plurality of ingress data ports, each ingress data port adapted to receive an input data stream from a corresponding first processor, each input data stream formed of ingress data packets, each ingress data packet including priority factors coded therein, (b) an aggregation module coupled to the ingress data ports, adapted to analyze and combine the plurality of input data steams into one aggregated data stream in response to the priority factors, (c) a memory coupled to the aggregation module, adapted to store analyzed data packets, and (d) an output data port coupled to the aggregation module, adapted to output the aggregated data stream to the second processor.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
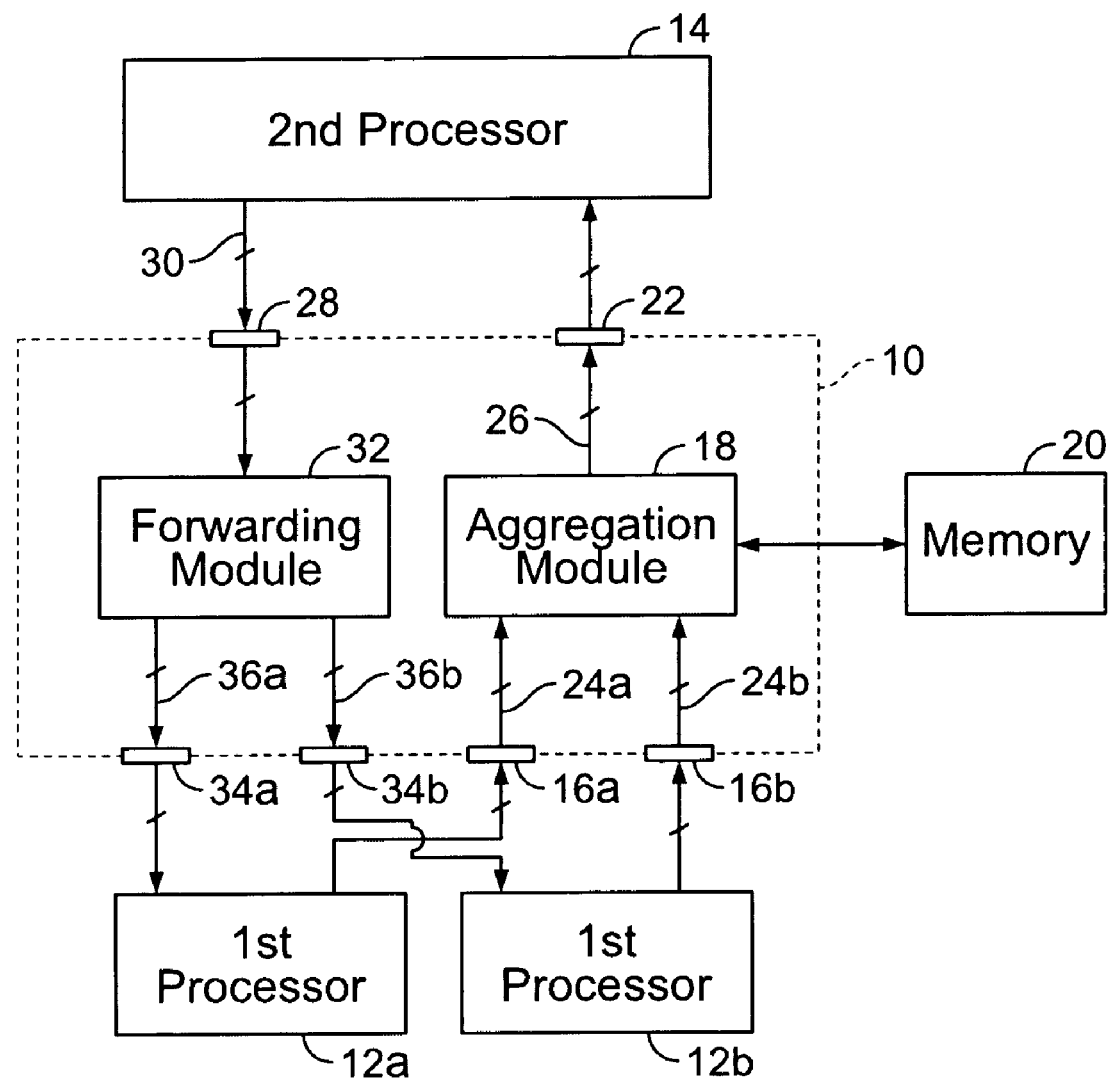
FIG. 1 is a block diagram schematically illustrating a circuit for aggregating a plurality of input data streams from first processors into one data stream for a second processor in accordance with one embodiment of the present invention.

Embodiments of the present invention are described herein in the context of a method and apparatus for aggregating input data streams. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described here.

FIG. 1 schematically illustrates a circuit 10 for aggregating a plurality of input data streams from first processors 12 (12a, 12b) into one data stream for a second processor 14 in accordance with one embodiment of the present invention. The circuit 10, the first processors 12, and the second processor 14 are provided on an electronic circuit substrate. For example, such an electronic circuit substrate may be a circuit board for a line card, network interface device, and the like.

As shown in FIG. 1, the circuit 10 includes a plurality of ingress data ports 16 (16a, 16b), an aggregation module 18 coupled to the plurality of ingress data ports 16, a memory 20 coupled to the aggregation module 18, and an output data port 22 coupled to the aggregation module 18. The aggregation module 18 may be implemented by a field programmable logic device (FPLD), field programmable gate array (FPGA), or the like. Each of the ingress data port 16 (16a or 16b) receives an input data stream 24 (24a or 24b) from a corresponding first processor 12 (12a or 12b). Each of the input data streams 24 (24a, 24b) is formed of ingress data packets. The aggregation module 18 is adapted to analyze and combine the plurality of input data steams 24 (24a, 24b) into one aggregated data stream 26 in response to priority factors of the ingress data packets. The memory 20 is adapted to stores analyzed data packets. The memory 20 may be an external buffer memory. The aggregated data stream 26 is output from the output data port 22 to the second processor 14. Although FIG. 1 show two first processors 12, the number of the first processors and the corresponding data streams is not limited to two.

Each of the ingress data packets includes, typically in its header, certain information such as indication of the type of the packets (ordinary data packet, protocol packet, control or management packet, and the like), port information, virtual LAN (VLAN) address, and the like. In accordance with one embodiment of the present invention, the information indicating the data packet is a certain protocol packet is used as a priority factor. In addition, port information and VLAN information may also be used as priority factors.

In accordance with one embodiment of the present invention, each of the first processors 12 and second processors 14 includes a logical interface providing logical interconnection between a Media Access Control sublayer (MAC) and a Physical layer (PHY), such as the 10 Gigabit Media Independent Interface (XGMII), through which data streams are received and transmitted. For example, the first processors 12 may be Layer-2 switching processors implementing Ethernet Maida Access Controllers and supporting the GMII, and the second processor 14 may be a data packet processor processing the aggregated packet data stream in the GMII format. Typically, the first processors 12 receive a receive (Rx) signal as the input data stream from transceivers, and the data flow from the first processors 12 to the second processor 14 through the aggregation module 18 forms a receive data path in the system. On the other hand, the data flow form the second processor 14 to the first processors 12 typically forms a transmit (Tx) data path.

Accordingly, in accordance with one embodiment of the present invention, as shown in FIG. 1, the circuit 10 further includes an egress data input port 28 adapted to receive a data stream 30 from the second processor 14, a forwarding module 32, and a plurality of egress data output ports 34 (34a, 34b) for outputting output data streams 36 (36a, 36b) to the corresponding first processors 12. The data stream 30 from the second processor 14 is formed of egress data packets. The forwarding module 32 is coupled between the egress data input port 28 and the egress data output ports 34, and forwards an egress data packet in the data stream 30 to one of the egress data output port 34 in response to destination information associated with the egress data packet. The forwarding module 32 may be implemented using a field programmable logic device (FPLD), field programmable gate array (FPGA), and the like.

Figure 2:
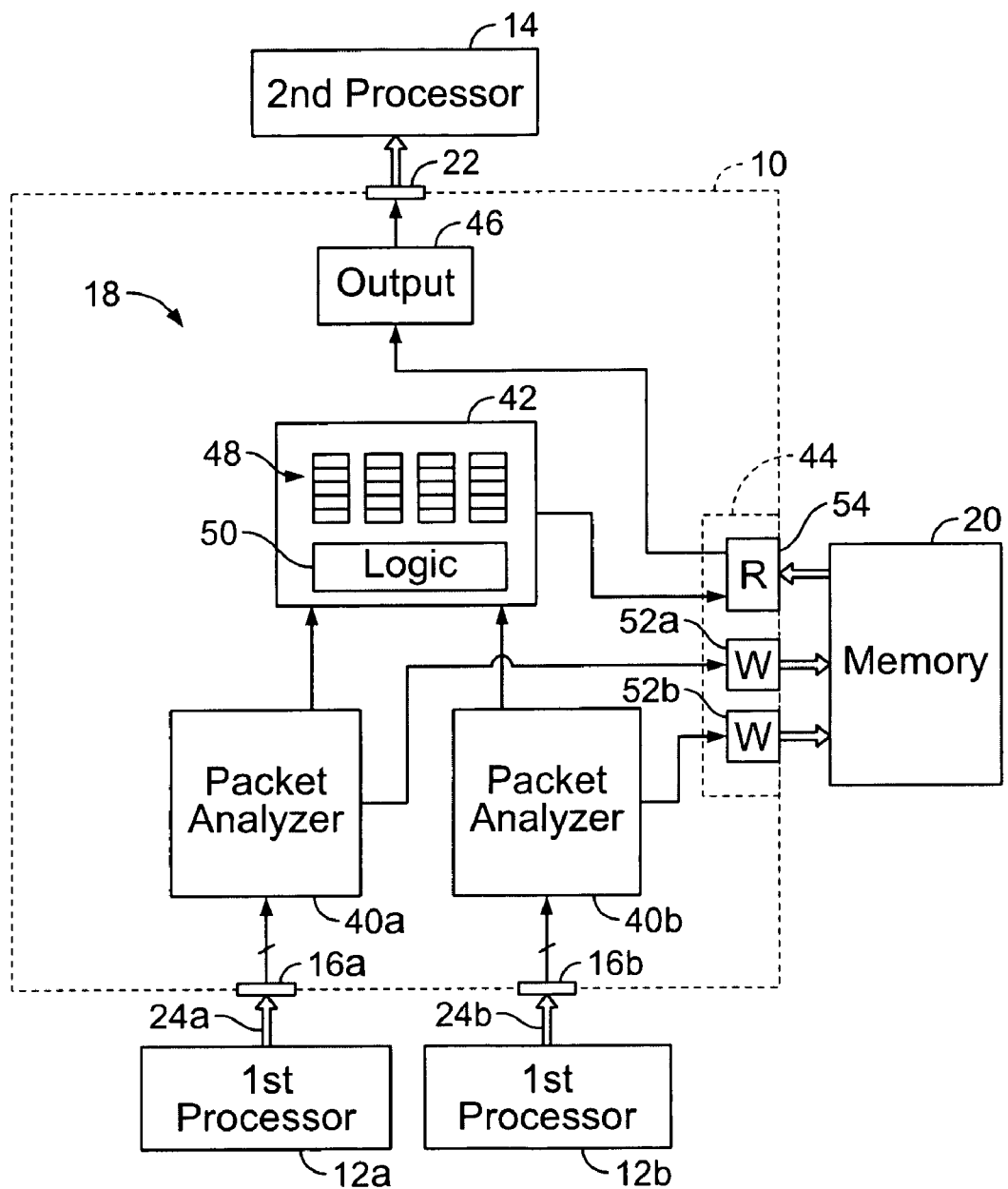
FIG. 2 is a block diagram schematically illustrating an example of implementation of the aggregation module of the circuit in accordance with one embodiment of the present invention.

FIG. 2 schematically illustrates an example of implementation of the aggregation module 18 of the circuit 10 in accordance with one embodiment of the present invention. The same or corresponding elements in FIGS. 1 and 2 are denoted by the same numeral references. In this implementation, the ingress data ports 16 include a first data port 16a for receiving a first input data stream 24a and a second data port 16b for receiving a second input data stream 24b. As shown in FIG. 2, the aggregation module 18 includes a first packet analyzer 40a, a second packet analyzer 40b, a queue module 42, a memory interface 44, and an output module 46. It should be noted that the number of the ports and the data streams is not limited to two.

The first packet analyzer 40a is coupled to the first data port 16a, and adapted to classify each of the ingress data packets in the first data stream 24a into one of predetermined priority classes based on the priority factors of the ingress data packets. Similarly, the second packet analyzer 40b is coupled to the second data port 16b, and adapted to classify each of the ingress data packets in the second data stream 24b into one of predetermined priority classes based on the priority factors. As described above, each of the ingress data packets includes, typically in the header, certain information such as indication of the type of the packets (ordinary data packet, protocol packet, control or management packet, and the like), port information, virtual LAN (VLAN) address, and the like, which can be used as priority factors. The priority class of each data packet is determined using one or more priority factors.

The queue module 42 includes a plurality of priority queues 48 and selection logic 50. Each of the priority queues 48 is provided for the corresponding priority class, and the selection logic 50 implements a queue scheme. For example, four (4) priority queue may be provided. The first and second packet analyzers 40a and 40b analyze and classify each of the ingress data packets into one of the priority classes based on the priority factors, and also generate a packet descriptor for each of the analyzed ingress data packets. The analyzed data packet is stored in the memory 20. The packet descriptor contains a reference to a memory location of its analyzed data packet. The packet descriptor is placed in a priority queue 48 corresponding to the priority class of the data packet. The selection logic 50 arbitrates and select a packet descriptor from among the priority queues 48 in accordance with the queue scheme. Such a queue scheme includes strict fair queuing, weighted fair queuing, and the like.

The memory interface 44 provides access to the external buffer memory 20, and may include a first write interface 52a, a second write interface 52b, and a common read interface 54. The first write interface 52a is coupled to the first packet analyzer 40a and adapted to write the analyzed data packets into the memory 20 at the memory location indicated by the corresponding packet descriptor. Similarly, the second write interface 52b is coupled to the second packet analyzer 40b, and adapted to write the analyzed data packets into the memory 20 at the memory location indicated by the corresponding packet descriptor. The common read interface 54 is coupled to the queue module 42 (the queue selection logic 50) and adapted to read a data packet from a memory location of the memory 20 indicated by the selected packet descriptor. The data packet read from the memory 20 is provided to the output module 46 which sends the data packets to the output data port 22 as the aggregated data stream. Providing separate write interfaces (and the corresponding write ports) and a common read interface (and the corresponding common read port) saves the number of input/output (I/O) pins of the circuit 10.

In the above-discussed embodiments, two or more input data streams from different processors are aggregated into one data stream. The present invention is also applicable when data from one processor (first processor) is oversubscribed by another (second processor), for example, when the first processor's uplink bandwidth (capacity) is greater than the second processor's data processing bandwidth (capacity). The circuit in accordance with the present invention can "bridge" the two processors and provides aggregation scheme for the oversubscribed data.

Figure 3:
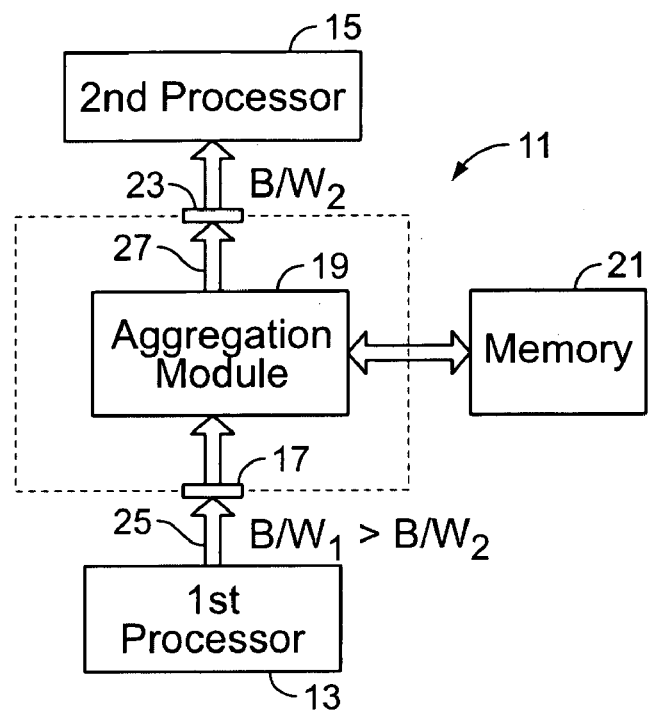
FIG. 3 is a block diagram schematically illustrating a circuit for aggregating an input data stream from a first processor into an aggregated data stream for a second processor in accordance with one embodiment of the present invention.

FIG. 3 schematically illustrates a circuit 11 for aggregating an input data stream from a first processor 13 into an aggregated data stream for a second processor 15, in accordance with one embodiment of the present invention. The circuit 11, the first processor 13, and the second processor 15 are provided on an electronic circuit substrate. Similarly to the circuit 10 described above, the circuit 11 includes an ingress data port 17, an aggregation module 19, a memory 21, and an output data port 23. The ingress data port receives the input data stream 25 from the first processor 13 via a first data link having a first bandwidth. Similarly to the input data stream in the circuit 10 above, the input data stream 25 is formed of ingress data packets, and each ingress data packet includes priority factors coded therein. The aggregation module 19 is coupled to the ingress data port 17. The aggregation module 19 analyzes and selectively recombines the ingress data packets in response to the priority factors so as to generate an aggregated data stream 27 for a second data link which has a second bandwidth smaller than the first bandwidth. The memory 21 is coupled to the aggregation module 19, and is adapted to store analyzed data packets. The output data port 23 is coupled to the aggregation module 19, and outputs the aggregated data stream 27 to the second processor 15.

The implementation of the circuit 11 can be done in a similar manner as that of the circuit 10 shown in FIG. 3 or circuits described in the following embodiments. One packet analyzer may be provided for the ingress data port 17, instead of two or more packet analyzers provided for respective ingress data ports in FIG. 1 or 2, so long as the packet analyzer can handle the first bandwidth of the input data stream. Alternatively, the input data stream 25 may be divided to be handled by two or more packet analyzers. In this embodiment, the aggregation module 19 selectively recombines the stored data packet using the packet descriptors in the priority queues according to the implemented queue scheme. The above-described aggregation scheme classifying and prioritizing ingress data packets, as well as that in the following embodiments, is equally applicable to the circuit 11. The resulting output data stream is outputted within the second bandwidth (capacity) of the second data link.

Figure 4:
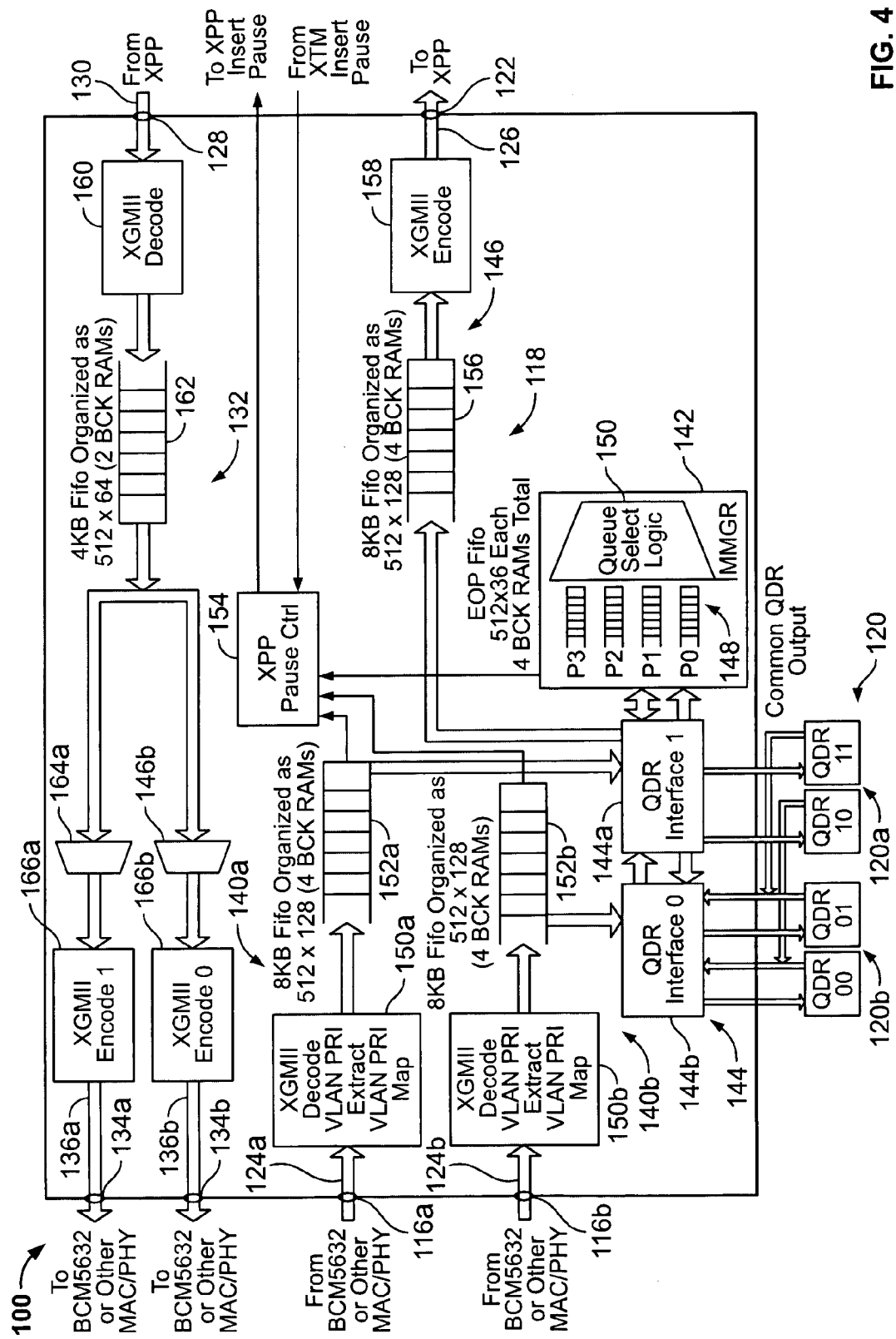
FIG. 4 is a block diagram schematically illustrating a circuit for aggregating a plurality of input data streams from first processors into one data stream for a second processor in accordance with one embodiment of the present invention.

FIG. 4 schematically illustrates a circuit 100 for aggregating a plurality of input data streams from first processors into one data stream for a second processor in accordance with one embodiment of the present invention. The circuit 100, the first processors, and the second processor are provided on an electronic circuit substrate. For example, such an electronic circuit substrate may be a circuit board for a line card, network interface device, and the like.

Similarly to the circuit 10 in FIGS. 1 and 2, the circuit 100 includes a plurality of ingress data ports 116 (116a, 116b), an aggregation module 118 coupled to the plurality of ingress data ports 116, a memory 120 coupled to the aggregation module 118, and an output data port 122 coupled to the aggregation module 118. Each of the ingress data ports 116 receives an input data stream 124 (124a or 124b) from a corresponding first processor (not shown). Each of the input data streams 124 (124a, 124b) is formed of ingress data packets, and each of the ingress data packets includes priority factors coded therein. The aggregation module 118 is adapted to analyze and combine the plurality of input data steams 124 (124a, 124b) into one aggregated data stream 126 in response to the priority factors. The memory 120 is adapted to stores analyzed data packets. The memory 120 may be an external buffer memory. The aggregated data stream 126 is output from the output data port 122 to the second processor (not shown). Although the number of the input data streams is not limited to two, the following description uses an example where two input data streams 124 are aggregated into one data stream 126.

As shown in FIG. 4, the ingress data ports 116 (116a, 116b), the aggregation module 118, the memory 120, and the output data port 122 are in the receive signal (Rx) path. The circuit 110 further includes, in the transmit (Tx) data path, an egress data input port 128 for receiving a data stream 130 from the second processor (not shown), a forwarding module 132, and egress data output ports 134 (134a, 134b) for outputting output data streams 136 (136a, 136b) to the corresponding first processors (not shown). The data stream 130 is formed of egress data packets. The forwarding module 132 is coupled between the egress data input port 128 and the egress data output ports 134, and adapted to forward an egress data packet in the data stream 130 to one of the egress data output ports 134 (134a or 134b) in response to destination information associated with the egress data packet. The aggregation module 118 and the forwarding module 132 may be implemented by a field programmable logic device (FPLD), field programmable gate array (FPGA), and the like.

As described above, each of the first processors and second processors may include a logical interface providing logical interconnection between a Media Access Control sublayer (MAC) and a Physical layer (PHY), such as the 10 Gigabit Media Independent Interface (XGMII), through which data streams are received and transmitted. For example, the first processors may be Layer-2 switching processors implementing Ethernet Maida Access Controllers and supporting GMII, and the second processor may be a data packet processor processing the aggregated packet data stream. Typically, the first processors receive a receive signal (Rx) as the input data stream from transceivers. For example, the first processors may be a 10 GbE switching processor that supports various features used for switching and forwarding operation of data packets as well as the interface standards such as IEEE 1000BASE-T. Typically, such a 10 GbE switching processor has ten or more Gigabit ports and a 10Gigabit uplink. For example, BCM 5632 processors, available from Broadcom Corporation, Irvine, Calif., may be used as such switching processors. However, any other MAC/PHY devices supporting required features can be used in the embodiment of the present invention. The second processor is typically a proprietary packet processor implementing specific packet processing processes and switching fabrics.

As shown in FIG. 4, the aggregation module 118 includes a first packet analyzer 140a, a second packet analyzer 140b, a queue module 142, a memory interface 144 including a first memory interface 144a and a second memory interface 144b, and an output module 146. The first packet analyzer 140a is coupled to the first data port 116a, the first memory interface 144a, and the queue module 142. Similarly, the second packet analyzer 140b is coupled to the second data port 116b, the second memory interface 144b, and the queue module 142. The first and second packet analyzers 140a and 140b analyze and classify each of the ingress data packets into one of the priority classes based on the priority factors contained in the ingress data packet. The first and second packet analyzers 140a and 140b also generate a packet descriptor for each of the analyzed ingress data packets. The analyzed data packets are store in the memory 120.

As shown in FIG. 4, the external memory 120 may include a first memory unit (memory bank) 120a and a second memory unit (memory bank) 120b for the first input data stream 124a and the second input data stream 124b, respectively. In addition, the memory interface 140 may also include a first memory interface 140a for the first input data stream 124a and a second memory interface 140b for the second input data stream 124b. Each of the memory unit may include a set of quad data rate (QDR) random access memories (RAMs) as shown in FIG. 4. It should be noted that write ports for the memory units 120a and 120b may be provided separately for the first and second input data streams 124a and 124b, and a read port may be common to both the first and second input data streams 124a and 124b.

The packet descriptor contains a reference to a memory location of its analyzed data packet in the memory 120. The packet descriptor is placed in the queue module 142. The queue module 142 includes a plurality of priority queues 148 and selection logic 150. Each of the priority queues 148 is provided for the corresponding priority class, and the packet descriptor is placed in the priority queue 148 corresponding to the priority class of its data packet. That is, packet descriptors of the ingress data packets for both of the first and second input data streams 124a and 124b are placed in the same priority queue 148 if they belong to the same priority class. The selection logic 150 implements a queue scheme, and arbitrates and select a packet descriptor from among the priority queues 148 in accordance with the queue scheme. Such a queue scheme includes strict fair queuing, weighted fair queuing, and the like.

The memory interface 144 provides access to the external memory 120. When the analyzed data packets are to be written into the memory 120 (memory unit 120a or 120b), the first or second packet analyzer 140a or 140b uses the corresponding memory interface 144a or 144b. When the stored data packet specified by a selected packet descriptor is to be read from the referenced memory location in the memory 120, one of the first and second interfaces is commonly used (the first interface 144a in this example) as the read interface. The data packet read from the memory 120 is provided to the output module 146 which sends the data packets to the output data port 122 as the aggregated data stream.

As shown in FIG. 4, the first packet analyzer 140a may include a first data decoder 150a coupled to the first ingress data port 116a. The first packet decoder 150a is adapted to decode each ingress data packet to extract the priority factors therefrom. Similarly, the second packet analyzer 140b may include a second data decoder 150b coupled to the second ingress data port 116b. The second packet decoder 150b is adapted to decode each ingress data packet to extract the priority factors therefrom. For example, these packet decoders are XGMII decoders suitable to decode and extract various information (typically contained in the headers) from the ingress data packet complying the specified interface format.

As described above, the priority factors include information indicating the type of the packets (ordinary data packet, protocol packet, control or management packet, and the like), destination port information, virtual LAN (VLAN) address, and the like. In accordance with one embodiment of the present invention, the information indicating that the data packet is a certain protocol packet is used for protocol-filtering to classify certain protocols. The data packets meet the protocol filter criterion may be given the highest priority such that protocol packets are less likely to be dropped or discarded. The port information and/or VLAN information is also used as priority factors.

In accordance with one embodiment of the present invention, the priority of a data packet is assigned using per-port priority, VLAN priority, and protocol filter. For example, assume that the ingress data packets are to be classified into four priority classes. Each priority factor of an ingress data packet may be assigned with a certain number such as 3, 2, 1, or 0, indicating the priority class, with number 3 indicating the highest priority. For example, each port number may be mapped onto one of the priority numbers. If the ingress data packet has been formatted with another priority queue scheme, such an external priority number, for example, a predefined VLAN priority number, may also be mapped onto one of the (internal) priority numbers 3, 2, 1, and 0. If the ingress data packet is a protocol packet, the priority factor associated with the protocol filter may be assigned with number 3. Then, the priority numbers assigned to respective factors of the data packet are "merged" or compared each other and the highest priority number is determined as the ultimate priority number for that data packet. The data packet is classified according to the ultimate priority number. For example, if the ingress data packet is a protocol packet, it would be classified into the highest priority class even if other priority factors receives lower priority number.

Referring back to FIG. 4, the aggregation module 118 may further include a first write buffer 152a coupled between the first data decoder 150a and the first memory interface 144a, and a second write buffer 152b coupled between the second data decoder 150b and the second memory interface 144b. These write buffers 152a and 152b are typically first-in first-out (FIFO) buffers and adapted to store the analyzed data packets until they are written into the memory 120. In accordance with one embodiment of the present invention, the aggregation module 118 may further include a flow control module 154. The flow control module 154 monitors the first write buffer 152a and the second write buffer 152b, and asserts a flow control signal if an amount of data stored in the first write buffer 152a or the second write buffer 152b exceeds a threshold. The flow control module 154 may also monitor the priority queues 148 in the queue module 142, and assert a flow control signal if an amount of data stored in a priority queue 148 exceeds a threshold. The flow control signal may be sent via the second processor (packet processor) to a module that controls transmit signals, and actual flow control may be done through the transmit signal path. For example, a pause control packet for the first processors is inserted in the data stream 130 such that the uplink data flow (input data streams 124) from first processors is paused.

The output module 146 may include a read buffer 156 coupled to a common read interface of the memory interface 144, and a data encoder 158 coupled to the read buffer 146. The data encoder 158 encodes the data packets into an interface format corresponding to that used by the first and second processors. For example, the data packets are encoded into the XGMII format to form an output data stream sent from the output data port 122.

As shown in FIG. 4, in the transmit signal (Tx) path, the circuit 110 includes the forwarding module 132 between the egress data input port 128 and the egress data output ports 134a and 134b. In accordance with one embodiment of the present invention, the forwarding module 132 includes a data decoder 160, a buffer 162, first and second forwarding logic 164a and 164b, and first and second data encoders 166a and 166b. The forwarding logic 164a and 146b forwards an egress data packet of the data stream 130 to one of the data encoders 166a or 166b in response to destination information associated with the egress data packet.

Figure 5:
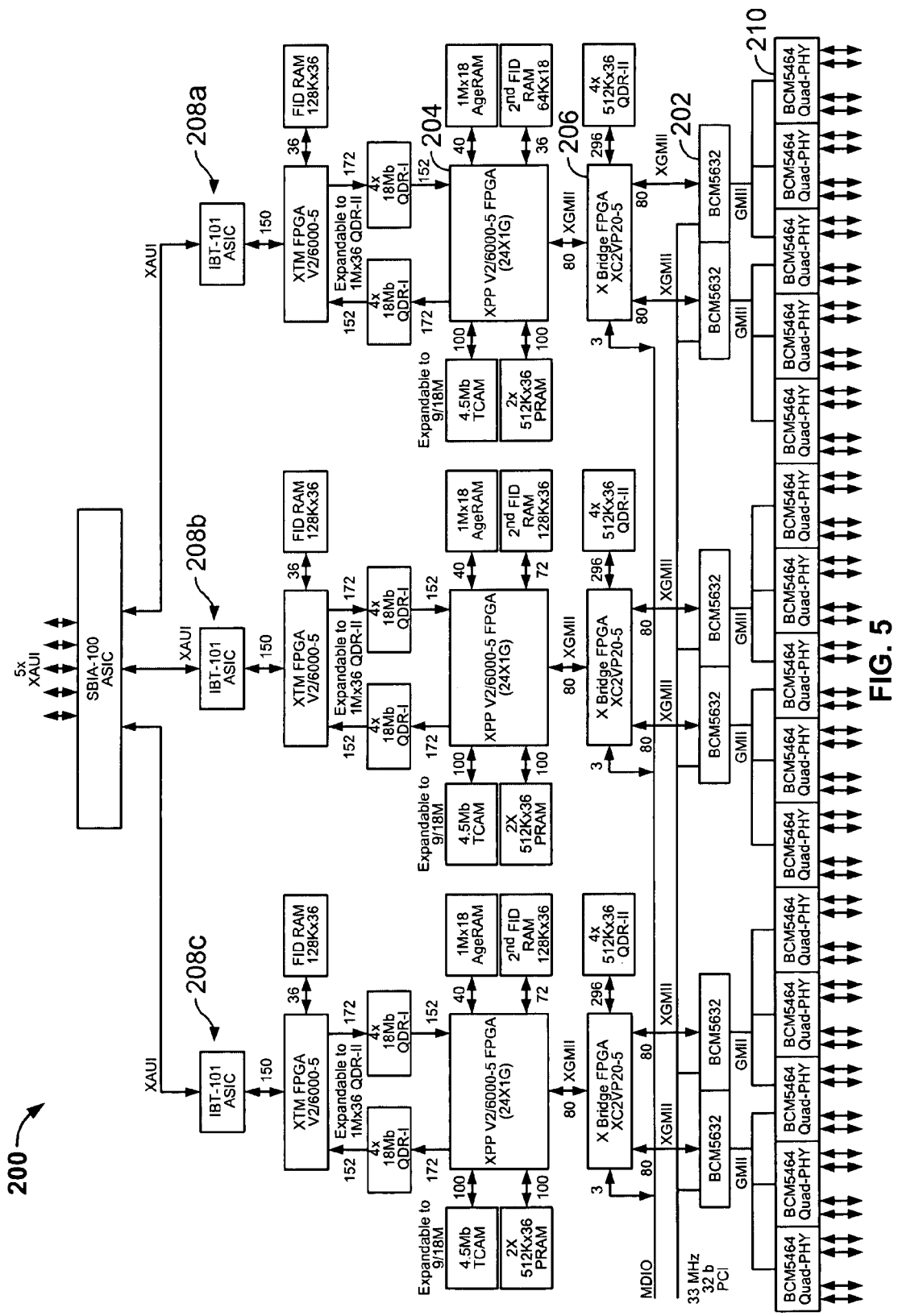
FIG. 5 is a system block diagram schematically illustrating an example in which two data streams from the switching processors are aggregated into one data stream for a packet processing processor by an aggregation circuit in accordance with one embodiment of the present invention.

FIG. 5 schematically illustrates an example of a system 200 in which two data streams from the switching processors 202 are aggregated into one data stream for a packet processing processor (XPP) 204 by an aggregation circuit 206 in accordance with one embodiment of the present invention. For example, the system 200 may be 60 Gigabit over Copper (60 GoC) line card, and the switching processors 202 may be Broadcom's BCM5632s explained above. The aggregation circuit 206 may be one of the circuits 10, 11, or 110 as described in embodiments above. As shown in FIG. 5, the system 200 includes three sets (stacks) of aggregation data pipe lines 208 (208a, 208b, and 208c). In each of the data pipe lines 208, the aggregation circuit 206 bridges two of the switching processors 202 to one packet processing processor 204. The data coupling between the switching processors 202 and the aggregation circuit 206, and that between the aggregation circuit 206 and the packet processor 206 are supported by the XGMII. Each of the switching processors 202 receives ten (10) Gigabit data streams from Gigabit Ethernet transceivers 210, for example, BCM5464 Quad-Port Gigabit Copper Transceivers, available from Broadcom Corporation, Irvine, Calif. The data aggregation of the oversubscribed input data is performed in the lower layers (PHY/MAC), prior to actual packet processing in higher layers.

Figure 6:
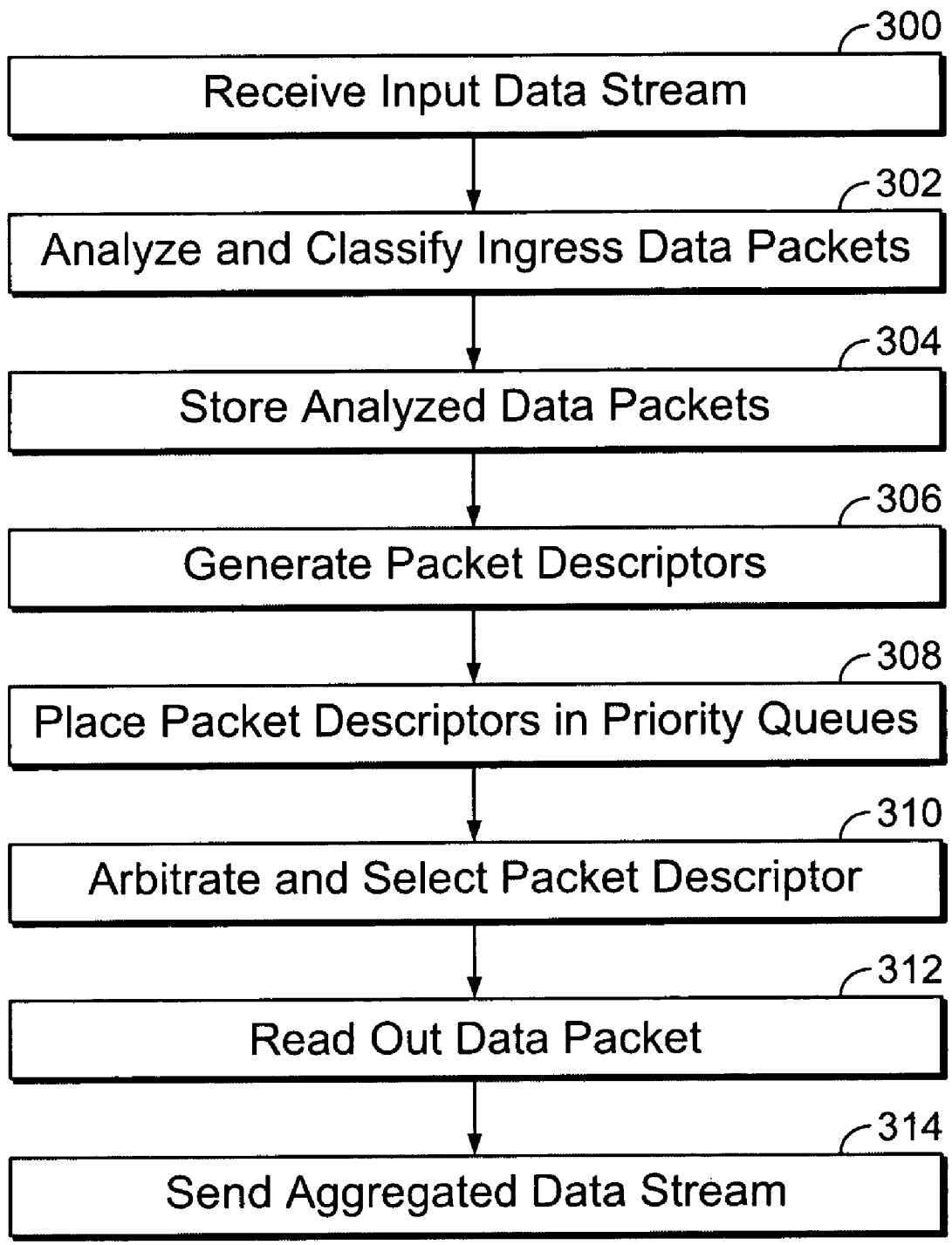
FIG. 6 is a process flow diagram schematically illustrating a method for aggregating a plurality of input data streams from first processors into one data stream for a second processor in accordance with one embodiment of the present invention.

FIG. 6 schematically illustrates a method for aggregating a plurality of input data streams from first processors into one data stream for a second processor in accordance with one embodiment of the present invention. The first processors and the second processor are provided on an electronic circuit substrate. The method may be performed by the circuits 10, 11, 110, or 204 described above.

An input data stream is received from each of the first processors (300). Each input data stream is formed of ingress data packets, and each ingress data packet includes priority factors coded therein, as described above. Each of the ingress data packets are analyzed and classified into one of predetermined priority classes based on the priority factors (302). The analyzed ingress data packet is stored in a memory (304), and a packet descriptor is generated for the analyzed ingress data packet (306). The packet descriptor contains a reference to a memory location of its analyzed data packet stored in the memory. The packet descriptor is placed in a priority queue corresponding to the priority class of the data packet (308). The packet descriptors from each data stream of the same priority class are placed in the same priority queue for that priority class. A packet descriptor is selected from among the priority queues by arbitrating the packet descriptors in the priority queues using selection logic implementing a queue scheme (310). A data packet corresponding to the selected packet descriptor is read from the memory (312), and an aggregated data stream is generated combining the data packets read from the memory, and aggregated data stream is sent to the second processor (314).

Figure 7:
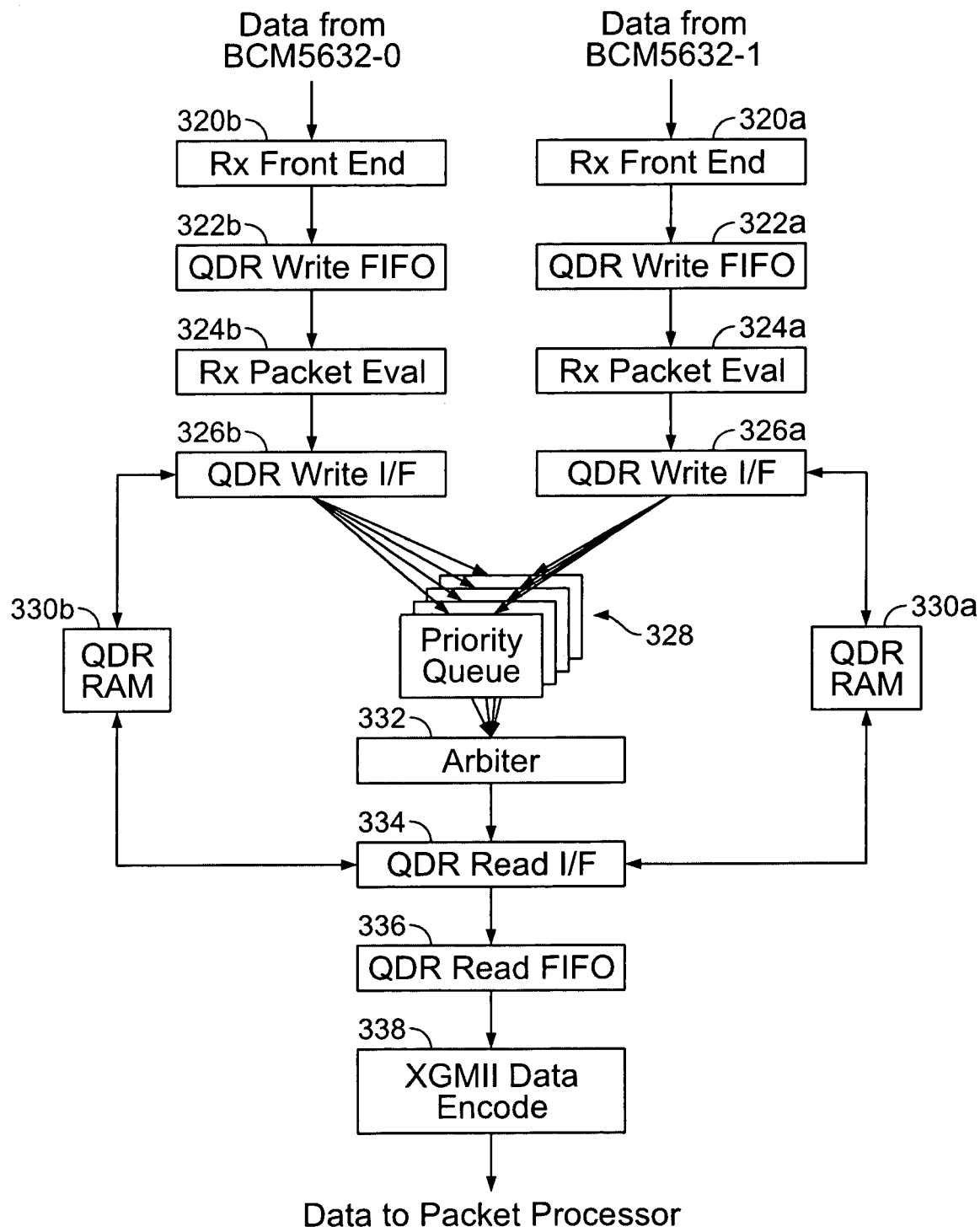
FIG. 7 is a data flow diagram schematically illustrating the method of aggregating a plurality of data streams along the receive (Rx) data path in accordance with one embodiment of the present invention.

FIG. 7 schematically illustrates the method of aggregating a plurality of data streams along the receive (Rx) data path in accordance with one embodiment of the present invention. The input data streams (two data streams in this example) from switching processors (first processors) are received at the respective receive signal (Rx) front ends (320a and 320b), and a header of each ingress data packet is decoded to extract the priority factors. The data format may be that of the XGMII. Ingress data packets are buffered in the corresponding write buffers (322a and 322b) during the packet analysis until they are stored in the memory. The write buffers may be QDR FIFOs. The ingress data packets are evaluated and classified into different priority classes in accordance with the priority factors (324a and 324b). The packet descriptors and analyzed ingress data packets are sent to the write interfaces (326a and 326b). The packet descriptors are placed into the priority queues 328 corresponding to the priority class of its ingress data packet. For example, four (4) priority queues are provided. The analyzed ingress data packets are stored in the corresponding buffer memories (330a and 330b). The buffer memories may be external QDR RAMs. The packet descriptors in the priority queues are arbitrated by queue selection logic (332), and the selected packet descriptor is sent to the read interface (334). Since the packet descriptor includes a reference to the memory location of its data packet, the corresponding data packet is read from the memory through the read interface. The read-out data packets are buffered in a read FIFO (336), and then encoded into the specific data format (338), for example that of the XGMII. The encoded data packets are sent as an output data stream to the second processor (packet processor)

As shown in FIG. 7, write-buffering, analyzing and classifying, and storing the data packets, and generating packet descriptors are performed separately for each data stream (320a through 326a, and 330a; 320b through 326b, and 330b). However, the packet descriptors for the both data streams are stored in the common priority queues and commonly arbitrated (328, 332). The stored data packet specified by the selected packet descriptors are also read out using the common read interface, and the data packets thereafter are processed in a single data channel (334 through 338). As described above, in analyzing and evaluating the ingress data packets, protocol-filtering, per-port priority, VLAN priority, and the like may be used as priority factors.

Figure 8:
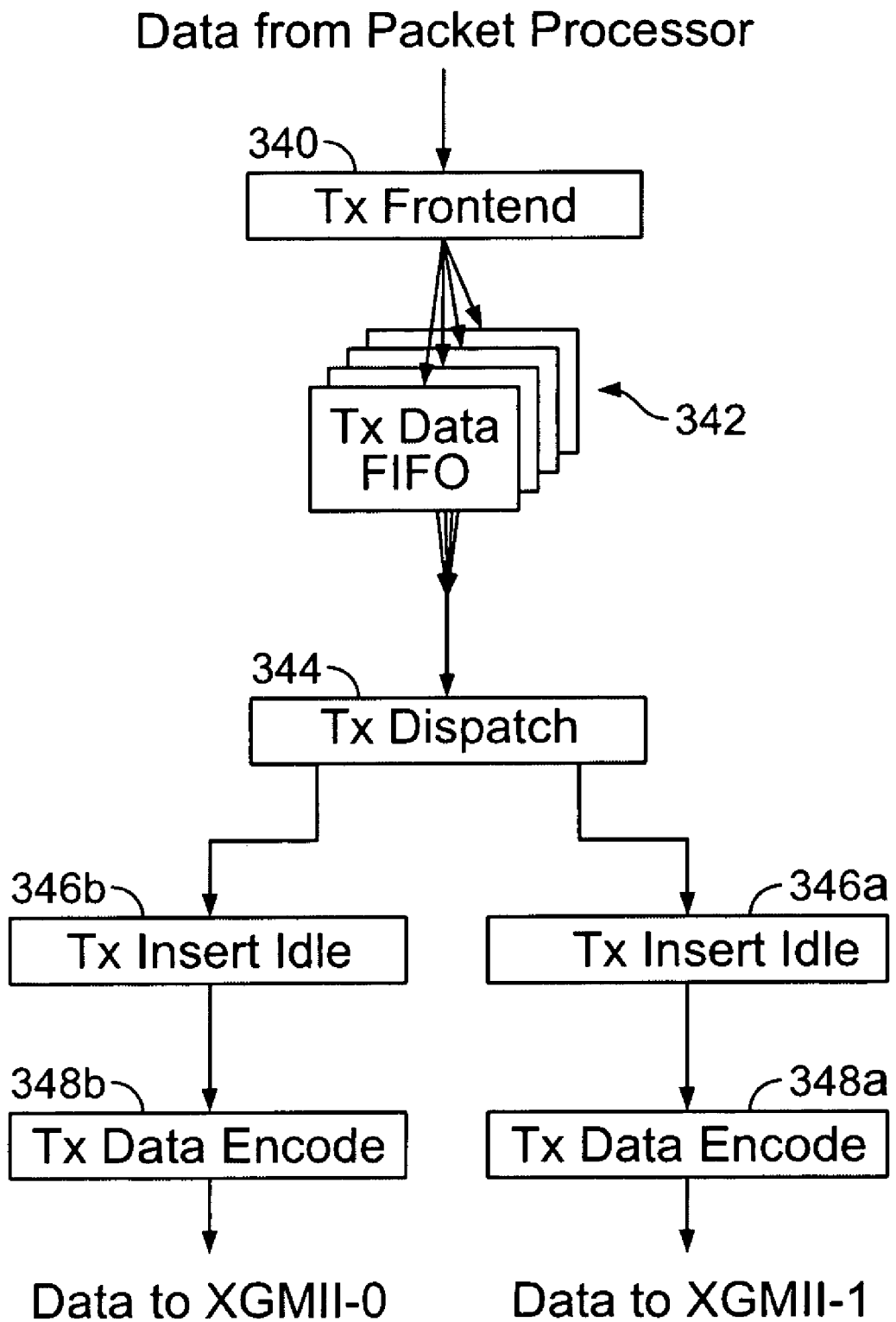
FIG. 8 is a data flow diagram schematically illustrating the method of aggregating a plurality of data streams along the transmit (Tx) data path in accordance with one embodiment of the present invention.

FIG. 8 schematically illustrates the method of aggregating a plurality of data streams along the transmit (Tx) data path in accordance with one embodiment of the present invention. A data stream formed of egress data packets from a packet processor (second processor) is received at a transmit signal (Tx) front end (340) and decoded to extract their destination information. The decoding may include decoding a specific interface data format such as the XGMII into a single data rate (SDR). The decoded data packets are buffered in a FIFO (342), and dispatched to the destination port by forwarding logic (344). Since one data stream is divided into two output data streams for different switching processors, an Idle Packet is inserted between End of Packet (EOP) and Start of Packet (SOP) in each data stream, such that the data for the other destination is replaced with the idle data (346*a* and 346*b*). Each of the output data stream is encoded for an interface format such as the XGMII (348*a* and 348*b*).

Figure 9:
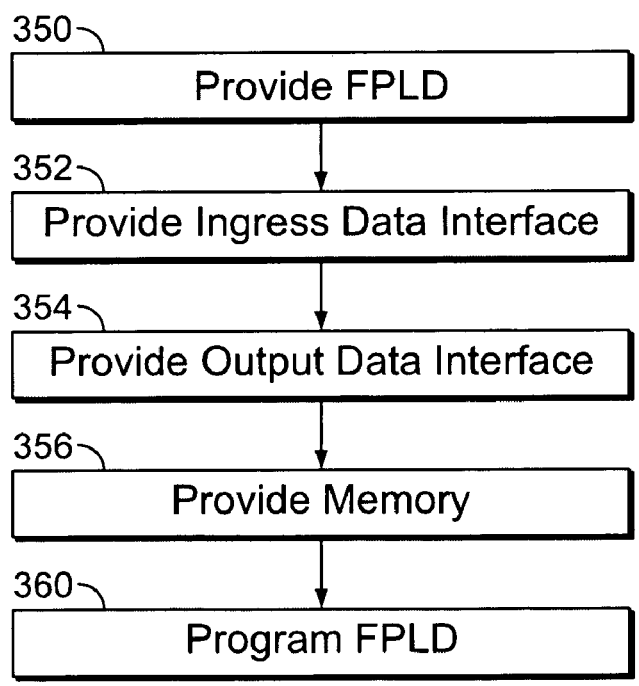
FIG. 9 is a process flow diagram schematically illustrating a method for aggregating a plurality of input data streams from first processors into one data stream for a second processor, in accordance with one embodiment of the present invention.

FIG. 9 schematically illustrates a method for aggregating a plurality of input data streams from first processors into one data stream for a second processor, in accordance with one embodiment of the present invention. The first processors and the second processor are provided on an electronic circuit substrate. A field programmable logic device (FPLD) coupled between the first processors and the second processor is provided (350). An ingress data interface is provided between each of the first processors and the FPLD (352). Each ingress data interface is adapted to couple an input data stream from a corresponding first processor to the FPLD. For example, the ingress data interface may be the XGMII supported by the first processor. Each input data stream is formed of ingress data packets, and each ingress data packet includes priority factors coded therein, as described above. An output data interface is also provided between the FPLD and the second processor (354), which is adapted to couple the aggregated data stream to the second processor. For example, the output data interface may be a XGMII supported by the second processor. A memory coupled to the FPLD is also provided (356), which is adapted to store analyzed data packets. The FPLD is programmed such that the FPLD analyzes and combines the plurality of input data steams into one aggregated data stream in response to the priority factors (360). The programmed FPLD performs the aggregation function for the Rx data steam as described above in detail with respect to other embodiments. The FPLD may also programmed such that it also performs forwarding functions for the Tx data stream as described above, with providing an input data interface for receiving the Tx data from the second processor, and output interfaces for outputting output data streams to the first processors.

The numbers of ports, processors, priority queues, memory banks, and the like are by way of example and are not intended to be exhaustive or limiting in any way. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A circuit for aggregating a plurality of input data streams from first processors into one data stream for a second processor, said circuit comprising:

a plurality of ingress data ports, each said ingress data port coupled to a corresponding first processor and adapted to receive an input data stream from the corresponding first processor, each input data stream comprising ingress data packets, each ingress data packet comprising at least one priority factor coded therein;

an aggregation module coupled to said plurality of ingress data ports and configured to receive the plurality of input data streams from the first processors using the plurality of ingress data ports, wherein an input data stream from a first processor is received via the ingress data port coupled to the first processor, said aggregation module adapted to analyze and combine the plurality of input data streams into one aggregated data stream in response to the at least one priority factor and to generate a packet descriptor comprising a reference to a memory location of its analyzed data packet;

a memory coupled to said aggregation module, said memory adapted to store analyzed data packets;

said memory comprising a plurality of priority queues each provided for a corresponding priority class, adapted to store the packet descriptor of each of the analyzed data packets classified to the corresponding priority class, the packet descriptor containing a reference to the memory location of its analyzed data packet in said memory; and an output data port coupled to said aggregation module, said output data port adapted to output the aggregated data stream to the second processor.

2. The circuit of claim 1, wherein each of the first processors and the second processor transmits and receives a data stream through a logical interface providing logical interconnection between a Media Access Control sublayer (MAC) and a Physical layer (PHY).

3. The circuit of claim 1, wherein the first processors are Layer-2 switching processors.

4. The circuit of claim 1, wherein the second processor is a data packet processor.

5. The circuit of claim 1, wherein said memory is an external buffer memory.

6. The circuit of claim 1, further comprising:

an egress data input port adapted to receive a data stream from the second processor, the data stream comprising egress data packets;

a plurality of egress data output ports, each adapted to output an output data stream to a corresponding one of the first processors; and a forwarding module coupled between said egress data input port and said egress data output port, said forwarding module adapted to forward an egress data packet in the data stream from the second processor to one of the egress data output port in response to destination information associated with said egress data packet.

7. The circuit of claim 1, wherein:

said ingress data ports comprise a first data port for receiving a first input data stream and a second data port for receiving a second input data stream; and said aggregation module comprises:

a first packet analyzer coupled to said first data port, adapted to classify each of the ingress data packets in the first data stream into one of predetermined priority classes based on the at least one priority factor;

a second packet analyzer coupled to said second data port, adapted to classify each of the ingress data packets in the second data stream into one of predetermined priority classes based on the at least one priority factor;

a queue module having
  a selection logic implementing a queue scheme, adapted to arbitrate and select a packet descriptor from among the priority queues;

a first write interface coupled to said first packet analyzer, adapted to write the analyzed data packets into said memory at the memory location indicated by the corresponding packet descriptor;

a second write interface coupled to said second packet analyzer, adapted to write the analyzed data packets into said memory at the memory location indicated by the corresponding packet descriptor;

a common read interface coupled to said queue selection logic, adapted to read a data packet corresponding to the selected packet descriptor from said memory; and an output module to send the data packets read from said memory to said output data port as the aggregated data stream.

8. The circuit of claim 7, wherein:
said first packet analyzer comprises a first data decoder coupled to said first ingress data port, adapted to decode a header of each ingress data packet to extract the at least one priority factor; and
said second packet analyzer comprises a second data decoder coupled to said second ingress data port, adapted to decode a header of each ingress data packet to extract the at least one priority factor.

9. The circuit of claim 7, wherein said output module comprises:
a read buffer coupled to said common read interface.

10. The circuit of claim 9, wherein said output module further comprising:
a data encoder coupled to said read buffer, adapted to encode the data packets into an interface format corresponding to the first interfaces before sending from the output data port.

11. The circuit of claim 7, wherein said aggregation module further comprises:
a first write buffer coupled between said first packet analyzer and said first write interface; and
a second write buffer coupled between said second packet analyzer and said second write interface.

12. The circuit of claim 11, wherein said aggregation module further comprises:
a flow control module adapted to assert a flow control signal if an amount of data stored in said first or second write buffer exceeds a threshold.

13. The circuit of claim 7, further comprising:
a flow control module adapted to assert a flow control signal if an amount of data stored in a corresponding priority queue in said queue module exceeds a threshold.

14. The circuit of claim 7, further comprising:
an egress data input port adapted to receive a data stream from the second processor, the data stream comprising egress data packets;
a plurality of egress data output ports, each adapted to output an output data stream to a corresponding one of the first processors;
a forwarding module coupled between said egress data input port and said egress data output ports, said forwarding module adapted to forward an egress data packet in the data stream from the second processor to one of the egress data output port in response to destination information associated with each egress data packet.

15. The circuit of claim 14, wherein said aggregation module further comprises:
a flow control module adapted to assert a flow control signal if an amount of data stored in said first or second write buffer exceeds a threshold, or if an amount of data stored in a corresponding priority queue in said queue module exceeds a threshold.

16. The circuit of claim 15, wherein said flow control module sends the flow control signal to said second processor, said second processor insert a pause control packet for said first processors in the data stream.

17. The circuit of claim 1:
wherein the aggregation module is implemented by a programmable device.

18. The circuit of claim 1:
wherein the at least one priority factor comprises an indication of whether the ingress packet contains protocol data or not.

19. The circuit of claim 18, wherein the at least one priority factor further comprises:
per-port priority; and
virtual LAN priority.

20. A circuit for aggregating an input data stream from a first processor into an aggregated data stream for a second processor, said circuit comprising:
a first data link adapted to receive the input data stream from the first processor, the first data link having a first bandwidth, the input data stream comprising ingress data packets, each ingress data packet comprising at least one priority factor coded therein;
an aggregation module coupled to the first data link and adapted to receive the input data stream from the first processor via the first data link, said aggregation module adapted to analyze and selectively recombine the ingress data packets in response to the at least one priority factor so as to generate an aggregated data;
a memory coupled to said aggregation module, said memory adapted to store analyzed data packets; and
a second data link coupled to said aggregation module, the second data link having a second bandwidth smaller than the first bandwidth, said second data link adapted to output the aggregated data stream from the aggregation module to the second processor;
wherein said aggregation module comprises:
a packet analyzer adapted to classify each of the ingress data packets into one of predetermined priority classes based on the at least one priority factor;
a queue module comprising
  a plurality of priority queues each provided for the corresponding priority class, adapted to store a packet descriptor of each of the analyzed data packets classified to the corresponding priority class, the packet descriptor containing a reference to a memory location of its analyzed data packet in said memory, and
  a selection logic implementing a queue scheme, adapted to arbitrate and select a packet descriptor from among the priority queues;
a read interface coupled to said queue module, adapted to read a data packet corresponding to the selected packet descriptor from said memory; and
an output module to send the data packets read from said memory to the second data link as the aggregated data stream.

21. The circuit of claim 20, wherein the first processor and the second processor comprise an interface providing logical interconnection between a Media Access Control sublayer (MAC) and a Physical layer (PHY).

22. The circuit of claim 20, wherein said memory is an external buffer memory.

23. The circuit of claim 20, further comprising:
a flow control module adapted to assert a flow control signal if an amount of data stored in a corresponding priority queue in said queue module exceeds a threshold.

24. The circuit of claim 20, wherein said packet analyzer comprises:
a data decoder coupled to the first data link, adapted to decode a header of each ingress data packet to extract the at least one priority factor.

25. The circuit of claim 20, wherein said output module comprises:
a read buffer coupled to said read interface.

26. The circuit of claim 25, wherein said output module further comprises:
a data encoder coupled to said read buffer, adapted to encode the data packets before sending using the second data link.

27. The circuit of claim 20, wherein said aggregation module further comprises:
a write interface coupled to said packet analyzer, adapted to write the analyzed data packets into said memory at the memory location indicated by the corresponding packet descriptor.

28. The circuit of claim 27, further comprising:
a write buffer coupled between said packet analyzer and said write interface.

29. The circuit of claim 28, further comprising:
a flow control module adapted to assert a flow control signal if an amount of data stored in said write buffer exceeds a threshold.

30. A method for aggregating a plurality of input data streams from first processors into one data stream for a second processor, said method comprising:
receiving an input data stream from each of the first processors, each input data stream comprising ingress data packets, each ingress data packet comprising at least one priority factor coded therein;
analyzing and classifying each of the ingress data packets into one of predetermined priority classes based on the at least one priority factor;
storing an analyzed data packet in a memory;
generating a packet descriptor for the analyzed ingress data packet, the packet descriptor containing a reference to a memory location of its analyzed data packet stored in the memory;
placing the packet descriptor in a priority queue corresponding to the priority class of the data packet;
arbitrating and selecting a packet descriptor from among the priority queues using selection logic implementing a queue scheme;
reading a data packet corresponding to the selected packet descriptor from the memory; and
sending the data packets read from the memory to the second processor as an aggregated data stream.

31. The method of claim 30, wherein said analyzing and classifying comprises:
protocol-filtering to determine if the ingress data packet is a certain protocol packet.

32. The method of claim 31, wherein the at least one priority factor comprises:

protocol filter priority;
per-port priority; and
virtual LAN priority.

33. The method of claim 30, wherein said analyzing comprises:
decoding a header of each ingress data packet to extract the at least one priority factor.

34. The method of claim 30, further comprising:
buffering the analyzed data packet in a write buffer before storing in the memory.

35. The method of claim 34, further comprising:
asserting a flow control signal if an amount of data stored in the write buffer exceeds a threshold.

36. The method of claim 30, further comprising:
buffering the data packet read from the memory in a read buffer.

37. The method of claim 30, further comprising:
encoding the data packets into an interface format before sending to the second processor.

38. The method of claim 30, further comprising:
asserting a flow control signal if a length of a corresponding priority queue exceeds a threshold.

39. The method of claim 30, wherein said memory is an external buffer memory.

40. The method of claim 30, wherein each of the first processors and the second processor transmits and receives a data stream through a logical interface providing logical interconnection between a Media Access Control sublayer (MAC) and a Physical layer (PHY).

41. The method of claim 30, wherein said analyzing and classifying, said generating, and said storing are performed separately for each data stream.

42. The method of claim 30, wherein, in said placing, the packet descriptors from each data stream of a same priority class are placed in the same priority queue for that priority class.

43. The method of claim 30, wherein said arbitrating and selecting, said reading, and said sending are performed as a single data channel.

44. A method for aggregating data packets, said method comprising:
receiving an input data stream from a first processor via a first data link having a first bandwidth, the input data stream comprising ingress data packets, each ingress data packet comprising at least one priority factor coded therein;
generating an aggregated data stream by analyzing and selectively recombining the ingress data packets in response to the at least one priority factor, the at least one priority factor comprising an indication of whether the ingress packet contains protocol data or not;
generating a packet descriptor for the analyzed ingress data packet, the packet descriptor containing a reference to a memory location of its analyzed data packet stored in a memory; and
outputting the aggregated data stream to a second processor via a second data link having a second bandwidth, wherein the first bandwidth is greater than the second bandwidth.

45. The method of claim 44 wherein analyzing the ingress data packets comprises decoding a header of each ingress data packet to extract the at least one priority factor.

46. The method of claim 44 further comprising:
encoding the aggregated data packets into an interface format before sending to the second processor.

47. The method of claim 44 wherein analyzing the ingress data packets is performed separately for each data stream.

48. A method for aggregating a plurality of input data streams from first processors into one data stream for a second processor, said method comprising:

provoding, for each first processor, an analyzer corresponding to the first processor, the analyzer being separate from the first processor and located in a communication path between the first processor and the second processor;

receiving an input data stream from each of the first processors, each input data stream comprising ingress data packets, each ingress data packet comprising at least one priority factor coded therein;

generating an aggregated data stream by combining the plurality of input data streams into one aggregated data stream in response to the at least one priority factor, the at least one priority factor comprising an indication of whether the ingress packet contains protocol data or not, wherein the generating comprises, for each first processor, receiving the input data stream from the first processor at an analyzer corresponding to the first processor, and analyzing the input data stream received from the first processor using the analyzer to classify each of the ingress data packets into one of a plurality of priority classes based on the at least one priority factor;

generating a packet descriptor for the ingress data packet, the packet descriptor containing a reference to a memory location of its ingress data packet stored in a memory; and outputting the aggregated data stream to the second processor.

49. A system comprising:

an input interface having a first bandwidth and configured to receive a data stream, wherein the data stream comprises ingress data packets, each ingress data packet comprising at least one priority factor coded therein;

a module coupled to the input and configured to receive the data stream, analyze the data stream and selectively recombine the ingress data packets in response to the at least one priority factor, the at least one priority factor comprising an indication of whether the ingress packet contains protocol data or not; and an output interface having a second bandwidth having a second bandwidth and configured to output the recombined ingress data packets;

wherein the first bandwidth is greater than the second bandwidth;

wherein the module is further configured to generate a packet descriptor for the analyzed ingress data packet, the packet descriptor containing a reference to a memory location of its analyzed data packet stored in a memory.

50. The system of claim 49 wherein configured to analyze the ingress data packets further comprises configured to decode a header of each ingress data packet to extract the at least one priority factor.

51. The system of claim 49 further comprising an encoder configured to encode the recombined ingress data packets into an interface format before sending to a processor.

52. The system of claim 49 wherein each ingress data packets is analyzed separately.

53. A system for aggregating data packets, said system comprising:

a means for receiving an input data stream from a first processor via a first data link having a first bandwidth, the input data stream comprising ingress data packets, each ingress data packet comprising at least one priority factor coded therein;

means for generating an aggregated data stream by analyzing and selectively recombining the ingress data packets in response to the at least one priority factor, the at least one priority factor comprising an indication of whether the ingress packet contains protocol data or not;

means for outputting the aggregated data stream to a second processor via a second data link having a second bandwidth, wherein the first bandwidth is greater than the second bandwidth; and means for generating a packet descriptor for the analyzed ingress data packet, the packet descriptor containing a reference to a memory location of its analyzed data packet stored in a memory.

54. The system of claim 53 wherein analyzing the ingress data packets comprises a means for decoding a header of each ingress data packet to extract the at least one priority factor.

55. The system of claim 53 further comprising:

means for encoding the aggregated data packets into an interface format before sending to the second processor.

56. The system of claim 53 wherein analyzing the ingress data packets is performed separately for each data stream.

* * * * *